United States Patent
Hirano et al.

(10) Patent No.: US 12,061,604 B2
(45) Date of Patent: Aug. 13, 2024

(54) SEARCHABLE ENCRYPTION SYSTEM

(71) Applicant: Mitsubishi Electric Corporation, Tokyo (JP)

(72) Inventors: Takato Hirano, Tokyo (JP); Yutaka Kawai, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/197,216

(22) Filed: May 15, 2023

(65) Prior Publication Data

US 2023/0289345 A1     Sep. 14, 2023

Related U.S. Application Data

(63) Continuation of application No. PCT/JP2021/000825, filed on Jan. 13, 2021.

(51) Int. Cl.
*G06F 16/245* (2019.01)
*G06F 16/2453* (2019.01)
*H04L 9/14* (2006.01)

(52) U.S. Cl.
CPC .......... *G06F 16/24547* (2019.01); *H04L 9/14* (2013.01)

(58) Field of Classification Search
CPC .............................. G06F 16/24547; H04L 9/14
See application file for complete search history.

(56) References Cited

U.S. PATENT DOCUMENTS 10,922,273 B1 *   2/2021   Hoang .................. G06F 16/313
10,997,301 B1 *   5/2021   Rivlin .................. G06F 21/602
(Continued)

FOREIGN PATENT DOCUMENTS

JP     2007-43353 A    2/2007
JP     2009-65326 A    3/2009
(Continued)

OTHER PUBLICATIONS

Shi e al. authoring "Fuzzy Multi-Keyword Query on Encrypted Data in the Cloud" published by IEEE on 2016. Download: https://ieeexplore.ieee.org/document/7917023.*
(Continued)

*Primary Examiner* — Hares Jami
(74) *Attorney, Agent, or Firm* — Birch, Stewart, Kolasch & Birch, LLP

(57) ABSTRACT

A registration device (400) generates ciphertext data using a new data key, generates an encrypted keyword using a new keyword key, and registers a set of the ciphertext data and the encrypted keyword. A search operation device (500) restores an old data key from the new data key, restores an old keyword key from the new keyword key, and generates a new search query and an old search query, using the new keyword key and the old keyword key, respectively. A data management device (600) finds an encrypted keyword that matches one of the new search query and the old search query, and outputs an encrypted search result including ciphertext data corresponding to the encrypted keyword that has been found. The search operation device decrypts a plaintext from the ciphertext data included in the encrypted search result, using one of the new data key and the old data key.

4 Claims, 40 Drawing Sheets

(56) References Cited

U.S. PATENT DOCUMENTS

| | | | |
|---|---|---|---|
| 2007/0033399 A1 | 2/2007 | Takeda | |
| 2009/0207068 A1 | 8/2009 | Inaba | |
| 2013/0024701 A1 | 1/2013 | Hwang et al. | |
| 2016/0125198 A1* | 5/2016 | Hahn | G06F 21/6227 713/165 |
| 2016/0266254 A1 | 9/2016 | Ohtomo et al. | |
| 2018/0254905 A1 | 9/2018 | Chun | |
| 2019/0179017 A1 | 6/2019 | Nagai | |
| 2020/0072977 A1 | 3/2020 | Shoji et al. | |
| 2020/0412536 A1* | 12/2020 | Hirano | H04L 9/30 |
| 2021/0182408 A1* | 6/2021 | Yeo | H04L 9/0662 |

FOREIGN PATENT DOCUMENTS

| | | |
|---|---|---|
| JP | 2011-18976 A | 1/2011 |
| JP | 2013-524619 A | 6/2013 |
| JP | 2016-169985 A | 9/2016 |
| JP | 2018-21764 A | 2/2018 |
| JP | 2018-525952 A | 9/2018 |
| JP | 2019-39924 A | 3/2019 |
| JP | 2020-34438 A | 3/2020 |
| WO | WO 2007/020704 A1 | 2/2007 |

OTHER PUBLICATIONS

International Search Report (PCT/ISA/210) issued in PCT/JP2021/000825, dated Apr. 13, 2021.

Matsuzaki et al. "A Method for Key-Updatable Symmetric Searchable Encryption", IEICE Technical Report, ISEC2019-54, 2019, 4 pages.

\* cited by examiner

Fig. 11

691: REGISTRATION DATABASE

| FILE NAME | CIPHERTEXT DATA | ENCRYPTED TAG | KEY GENERATION NUMBER |
|---|---|---|---|
| File(M1) | CT1 | ET1_{TOKYO}、ET1_{OSAKA} | 1 |
| File(M2) | CT2 | ET2_{OSAKA}、ET2_{AICHI} | 1 |
| File(M3) | CT3 | ET3_{TOKYO} | 1 |
| File(M4) | CT4 | ET4_{HIROSHIMA}、ET4_{KYOTO} | 2 |
| File(M5) | CT5 | ET5_{TOKYO} | 2 |
| ... | ... | ... | ... |

SEARCH RESULT RES

| FILE NAME | KEYWORD |
|---|---|
| File(M1)、File(M3) | TOKYO |
| File(M1)、File(M2) | OSAKA |
| File(M2) | AICHI |
| ... | ... |

691: REGISTRATION DATABASE

| FILE NAME AND CIPHERTEXT DATA | ENCRYPTED INDEX | KEY GENERATION NUMBER |
|---|---|---|
| (File(M1), CT1)<br>(File(M2), CT2)<br>(File(M3), CT3) | EI1 | 1 |
| (File(M4), CT4)<br>(File(M5), CT5) | EI2 | 2 |
| ... | ... | |

SEARCHABLE ENCRYPTION SYSTEM

CROSS REFERENCE TO RELATED APPLICATION

This application is a Continuation of PCT International Application No. PCT/JP2021/000825, filed on Jan. 13, 2021, which is hereby expressly incorporated by reference into the present application.

TECHNICAL FIELD

The present disclosure relates to searchable encryption.

BACKGROUND ART

Searchable encryption is a technology to search for encrypted data while the encrypted data remains encrypted. That is, searchable encryption is a technology to search for encrypted data without decryption.

Recently, searchable encryption is attracting attention as a security technology for protecting confidential information from eavesdropping by a server administrator and eavesdropping by a malicious software in a cloud service. That is, searchable encryption is attracting attention as a security technology for managing data on the Internet.

There are two types of searchable encryption schemes: a common-key scheme and a public-key scheme.

In the common-key scheme, a common-key cryptographic technology is used, and registerers and searchers are limited.

In the public-key scheme, a public-key cryptographic technology is used, and searchers are limited but registerers are not limited.

As operations of the searchable encryption scheme, in a registration process a registerer encrypts data and then stores the data in a server. In a search process, a searcher encrypts a search keyword and then transmits the search keyword to the server. Then, the server checks the search keyword against the data to check whether the search keyword matches the data without decrypting the search keyword that has been encrypted and the data that has been encrypted and stored.

CITATION LIST

Non-Patent Literature

Non-Patent Literature 1: A Method for Key-Updatable Symmetric Searchable Encryption. IEICE Technical Report ISEC2019-54.

SUMMARY OF INVENTION

Technical Problem

In a cryptographic technology, a key may be updated regularly from the viewpoint of key leakage risk. Therefore, it is conceivable that a key is updated also in searchable encryption.

If a key is simply replaced with a new key in searchable encryption, data encrypted with the old key cannot be searched using the new key. For this reason, the old key cannot still be discarded and needs to be kept continuously. In addition, a search keyword needs to be encrypted using all the keys that are kept. Alternatively, data encrypted with the old key needs to be re-encrypted with the new key so that the new key can handle all.

Non-Patent Literature 1 discloses a method for updating a key using a common-key scheme that can specify, for each piece of encrypted data, a user who is allowed to retrieve this encrypted data.

For example, a scheme as described below is disclosed. By providing encrypted data with an attribute such as "can be retrieved if the number of key updates is i times or more" as an attribute of a user who can retrieve the encrypted data, the encrypted data can be retrieved with a key that has been updated i or more times. That is, when a key that has been updated i times is denoted as $SK(i)$, a user who has $SK(i+1)$, $SK(i+2)$, or a newer key can retrieve this encrypted data. However, even if a user who has $SK(i-1)$, $SK(i-2)$, or an older key searches for this encrypted data with a matching search keyword, it will not be determined that this encrypted data matches the search keyword.

Therefore, in the method of Non-Patent Literature 1, even if a key update is performed, the key size and the encrypted search keyword size will not increase.

However, in the method of Non-Patent Literature 1, the key size, the encrypted search keyword size, and the encrypted data size are determined depending on the maximum number of key updates. That is, if the maximum number of key updates is set to a large number, the key size, the encrypted search keyword size, and the encrypted data size also increase.

An object of the present disclosure is to make the key size, the encrypted search keyword size, and the encrypted data size not dependent on the maximum number of key updates.

Solution to Problem

A searchable encryption system of the present disclosure includes
- a searchable encryption data generating unit to encrypt a plaintext to generate ciphertext data, using a new data key generated by multiple encryption, and encrypt a registration keyword to generate an encrypted keyword, using a new keyword key generated by the multiple encryption;
- a registration unit to register a set of the ciphertext data and the encrypted keyword in a registration database;
- a restoration unit to restore an old data key from the new data key and restore an old keyword key from the new keyword key, based on the multiple encryption;
- a search query generating unit to encrypt a search keyword to generate a new search query and an old search query, using the new keyword key and the old keyword key, respectively;
- a search unit to find an encrypted keyword that matches one of the new search query and the old search query from the registration database;
- a search result output unit to output an encrypted search result including ciphertext data corresponding to the encrypted keyword that has been found; and
- a decryption unit to decrypt a plaintext from the ciphertext data included in the encrypted search result, using one of the new data key and the old data key.

Advantageous Effects of Invention

According to the present disclosure, the key size, the encrypted search keyword size, and the encrypted data size can be made to be not dependent on the maximum number of key updates.

BRIEF DESCRIPTION OF DRAWINGS

FIG. 11 is a figure illustrating an example of a registration database 691 in Embodiment 1;

DESCRIPTION OF EMBODIMENTS

Figure 1:
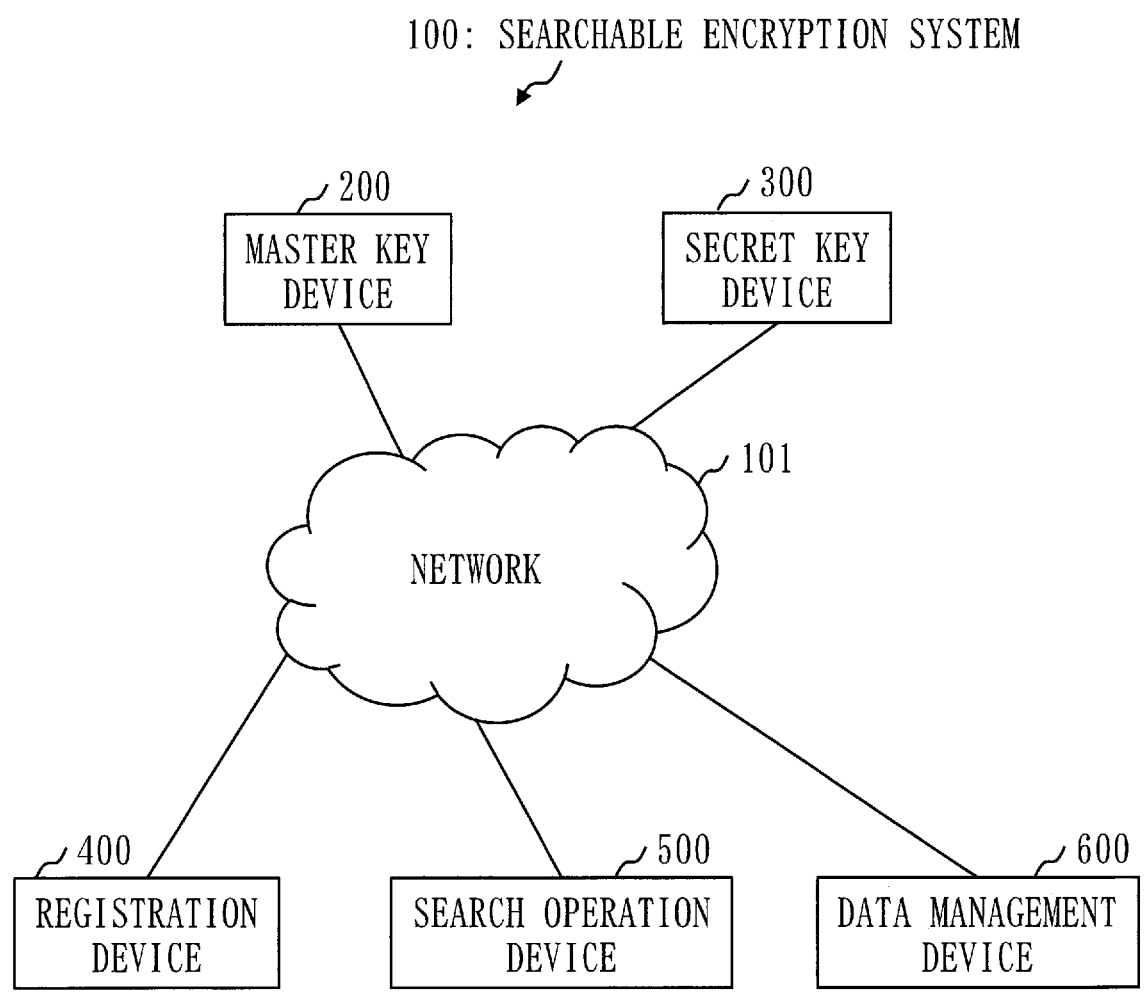
FIG. 1 is a configuration diagram of a searchable encryption system 100 in Embodiment 1.

In the embodiments and drawings, the same elements or corresponding elements are denoted by the same reference sign. Description of an element denoted by the same reference sign as that of an element that has been described will be suitably omitted or simplified. Arrows in figures mainly indicate flows of data or flows of processing.

Embodiment 1

A searchable encryption system 100 will be described based on FIGS. 1 to 16.

*Description of Configurations*

Based on FIG. 1, a configuration of the searchable encryption system 100 will be described.

The searchable encryption system 100 includes a master key device 200, a secret key device 300, a registration device 400, a search operation device 500, and a data management device 600.

The devices of the searchable encryption system 100 communicate with one another through a network 101.

Figure 2:
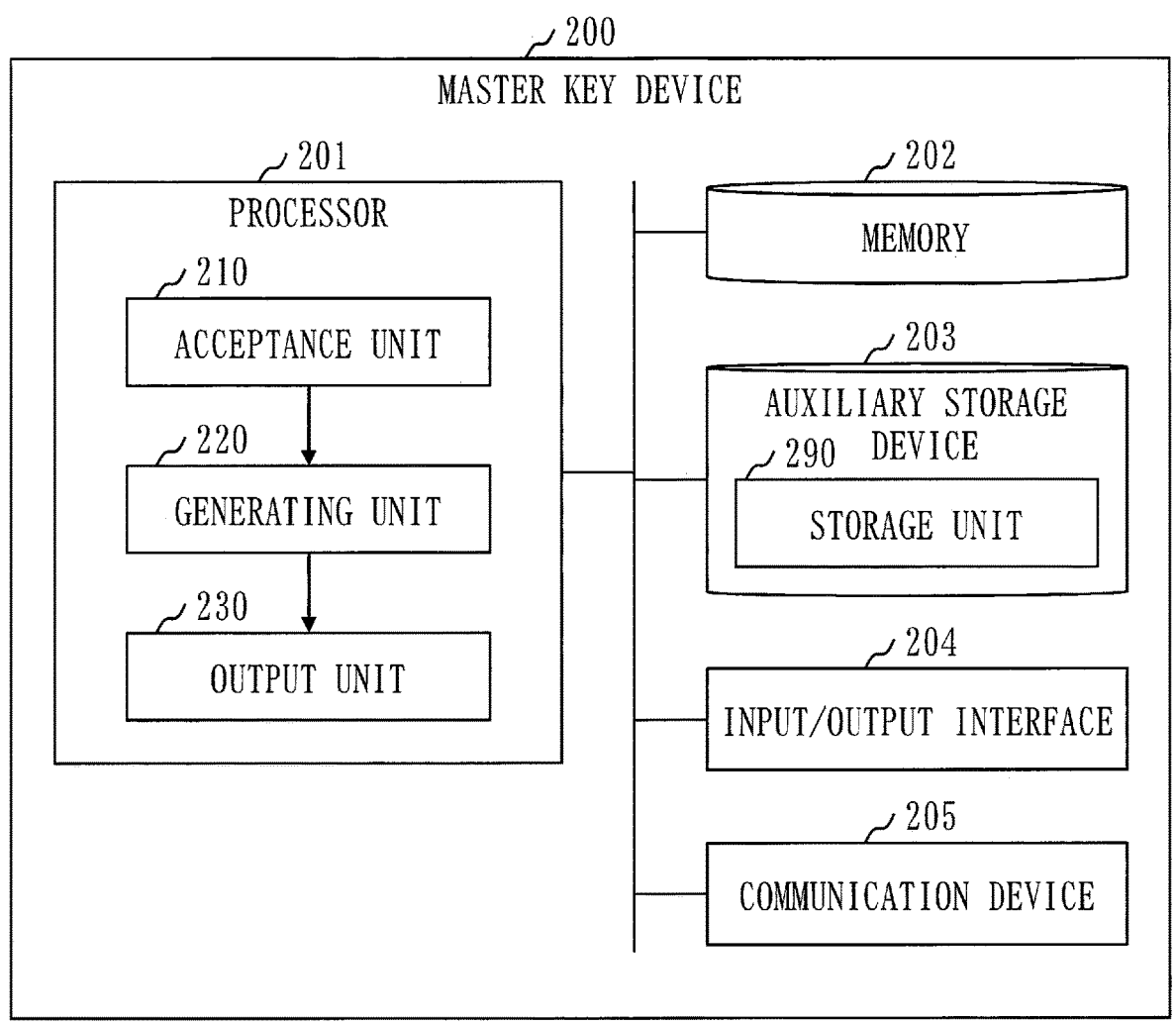
FIG. 2 is a configuration diagram of a master key device 200 in Embodiment 1.

Based on FIG. 2, a configuration of the master key device 200 will be described.

The master key device 200 is a computer that includes hardware such as a processor 201, a memory 202, an auxiliary storage device 203, and an input/output interface 204. These hardware components are connected with one another through signal lines.

The processor 201 is an IC that performs operational processing, and controls other hardware components. For example, the processor 201 is a CPU, a DSP, or a GPU.

IC is an abbreviation for integrated circuit.

CPU is an abbreviation for central processing unit.

DSP is an abbreviation for digital signal processor.

GPU is an abbreviation for graphics processing unit.

The memory 202 is a volatile or non-volatile storage device. The memory 202 is also called a main storage device or a main memory. For example, the memory 202 is a RAM. Data stored in the memory 202 is saved in the auxiliary storage device 203 as necessary.

RAM is an abbreviation for random access memory.

The auxiliary storage device 203 is a non-volatile storage device. For example, the auxiliary storage device 203 is a ROM, an HDD, or a flash memory. Data stored in the auxiliary storage device 203 is loaded into the memory 202 as necessary.

ROM is an abbreviation for read only memory.

HDD is an abbreviation for hard disk drive.

The input/output interface 204 is a port to which an input device and an output device are connected. For example, the input/output interface 204 is a USB terminal, the input device is a keyboard and a mouse, and the output device is a display. Input to and output from the master key device 200 are performed using the input/output interface 204.

USB is an abbreviation for Universal Serial Bus.

A communication device 205 is a receiver and a transmitter. For example, the communication device 205 is a communication chip or a NIC. Communication of the master key device 200 is performed using the communication device 205.

NIC is an abbreviation for network interface card.

The master key device 200 includes elements such as an acceptance unit 210, a generating unit 220, and an output unit 230. These elements are realized by software.

The auxiliary storage device 203 stores a master key program to cause a computer to function as the acceptance unit 210, the generating unit 220 (master key generating unit), and the output unit 230 (master key output unit). The master key program is loaded into the memory 202 and executed by the processor 201.

The auxiliary storage device 203 further stores an OS. At least part of the OS is loaded into the memory 202 and executed by the processor 201.

The processor 201 executes the master key program while executing the OS.

OS is an abbreviation for operating system.

Input data and output data of the master key program are stored in a storage unit 290.

The auxiliary storage device 203 functions as the storage unit 290. However, a storage device such as the memory 202, a register in the processor 201, and a cache memory in the processor 201 may function as the storage unit 290 in place of the auxiliary storage device 203 or together with the auxiliary storage device 203.

The master key device 200 may include a plurality of processors as an alternative to the processor 201. The plurality of processors share the functions of the processor 201.

The master key program can be recorded (stored) in a computer readable format in a non-volatile recording medium such as an optical disc or a flash memory.

Figure 3:
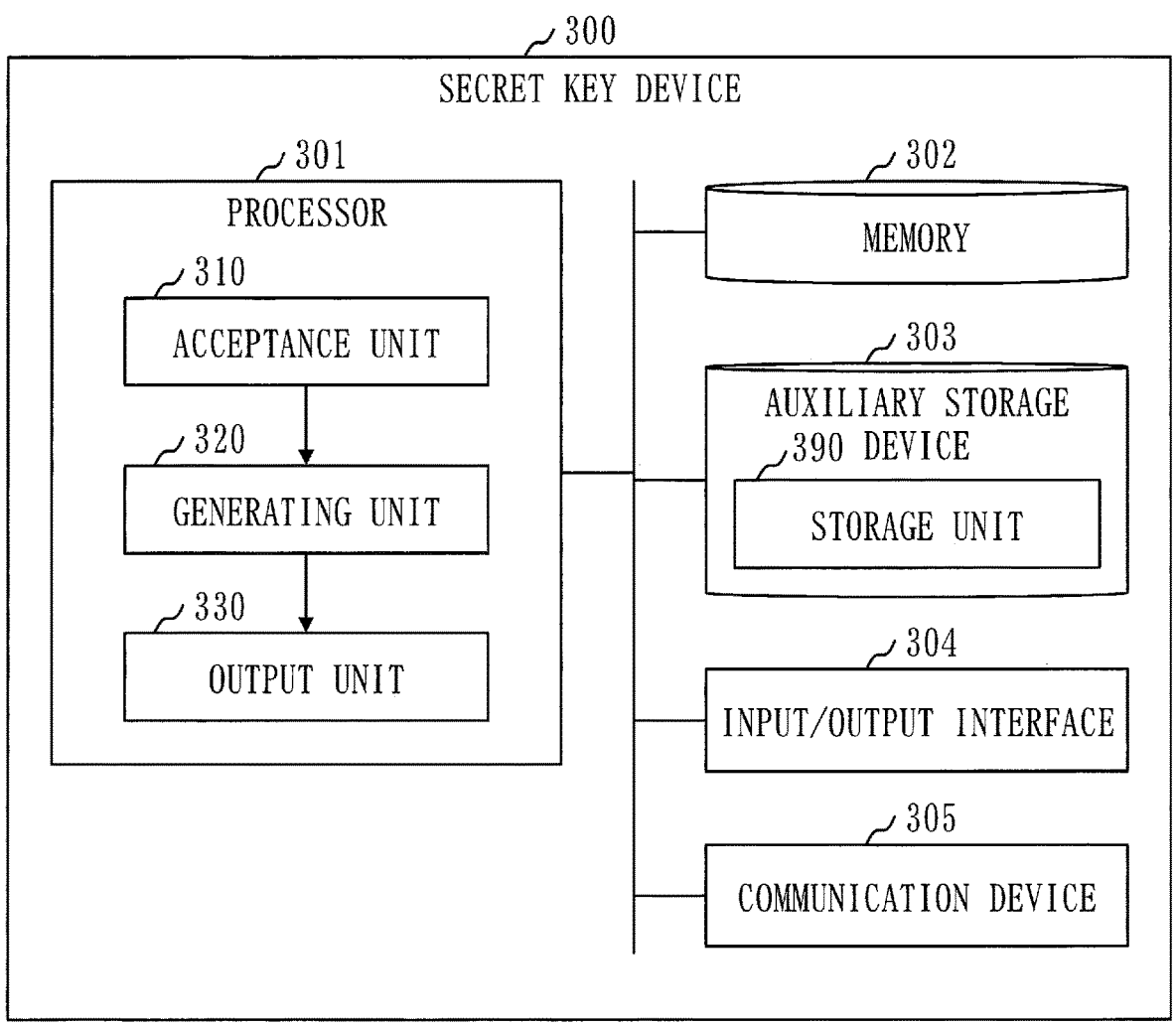
FIG. 3 is a configuration diagram of a secret key device 300 in Embodiment 1.

Based on FIG. 3, a configuration of the secret key device 300 will be described.

The secret key device 300 is a computer that includes hardware such as a processor 301, a memory 302, an auxiliary storage device 303, an input/output interface 304, and a communication device 305. These hardware components are connected with one another through signal lines.

The processor 301 is an IC that performs operational processing, and controls other hardware components. For example, the processor 301 is a CPU, a DSP, or a GPU.

The memory 302 is a volatile or non-volatile storage device. The memory 302 is also called a main storage device or a main memory. For example, the memory 302 is a RAM. Data stored in the memory 302 is saved in the auxiliary storage device 303 as necessary.

The auxiliary storage device 303 is a non-volatile storage device. For example, the auxiliary storage device 303 is a ROM, an HDD, or a flash memory. Data stored in the auxiliary storage device 303 is loaded into the memory 302 as necessary.

The input/output interface 304 is a port to which an input device and an output device are connected. For example, the input/output interface 304 is a USB terminal, the input device is a keyboard and a mouse, and the output device is a display. Input to and output from the secret key device 300 are performed using the input/output interface 304.

The communication device 305 is a receiver and a transmitter. For example, the communication device 305 is a communication chip or a NIC. Communication of the secret key device 300 is performed using the communication device 305.

The secret key device 300 includes elements such as an acceptance unit 310, a generating unit 320, and an output unit 330. These elements are realized by software.

The auxiliary storage device 303 stores a secret key program to cause a computer to function as the acceptance unit 310, the generating unit 320 (secret key generating unit), and the output unit 330 (secret key output unit). The secret key program is loaded into the memory 302 and executed by the processor 301.

The auxiliary storage device 303 further stores an OS. At least part of the OS is loaded into the memory 302 and executed by the processor 301.

The processor 301 executes the secret key program while executing the OS.

Input data and output data of the secret key program are stored in a storage unit 390.

The auxiliary storage device 303 functions as the storage unit 390. However, a storage device such as the memory 302, a register in the processor 301, and a cache memory in the processor 301 may function as the storage unit 390 in place of the auxiliary storage device 303 or together with the auxiliary storage device 303.

The secret key device 300 may include a plurality of processors as an alternative to the processor 301. The plurality of processors share the functions of the processor 301.

The secret key program can be recorded (stored) in a computer readable format in a non-volatile recording medium such as an optical disc or a flash memory.

Figure 4:
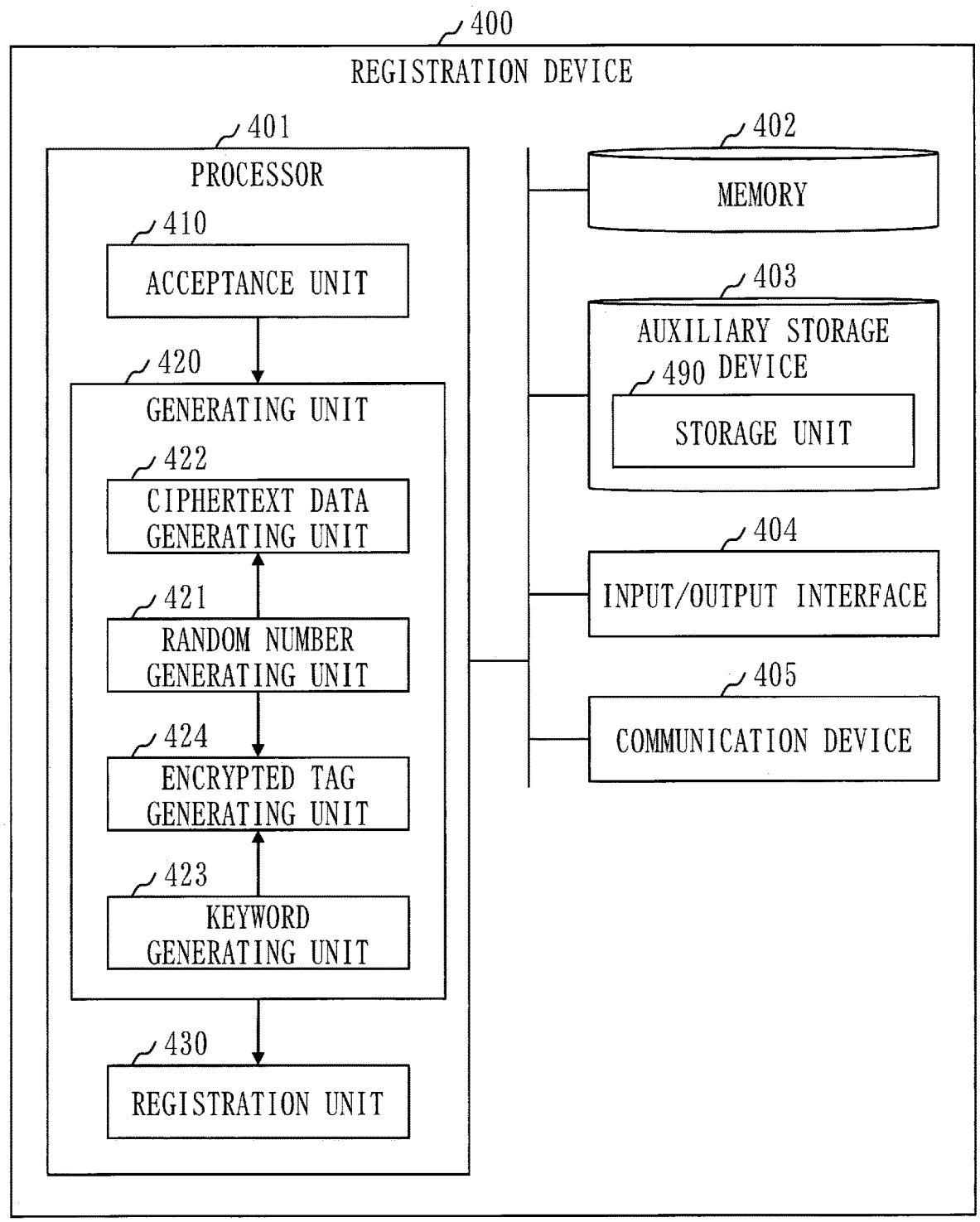
FIG. 4 is a configuration diagram of a registration device 400 in Embodiment 1.

Based on FIG. 4, a configuration of the registration device 400 will be described.

The registration device 400 is a computer that include hardware such as a processor 401, a memory 402, an auxiliary storage device 403, an input/output interface 404, and a communication device 405. These hardware components are connected with one another through signal lines.

The processor 401 is an IC that performs operational processing, and controls other hardware components. For example, the processor 401 is a CPU, a DSP, or a GPU.

The memory 402 is a volatile or non-volatile storage device. The memory 402 is also called a main storage device or a main memory. For example, the memory 402 is a RAM. Data stored in the memory 402 is saved in the auxiliary storage device 403 as necessary.

The auxiliary storage device 403 is a non-volatile storage device. For example, the auxiliary storage device 403 is a ROM, an HDD, or a flash memory. Data stored in the auxiliary storage device 403 is loaded into the memory 402 as necessary.

The input/output interface 404 is a port to which an input device and an output device are connected. For example, the input/output interface 404 is a USB terminal, the input device is a keyboard and a mouse, and the output device is a display. Input to and output from the registration device 400 are performed using the input/output interface 404.

The communication device 405 is a receiver and a transmitter. For example, the communication device 405 is a communication chip or a NIC. Communication of the registration device 400 is performed using the communication device 405.

The registration device 400 includes elements such as an acceptance unit 410, a generating unit 420 (searchable encryption data generating unit), and a registration unit 430. These elements are realized by software.

The generating unit 420 includes elements such as a random number generating unit 421, a ciphertext data generating unit 422, a keyword generating unit 423, and an encrypted tag generating unit 424.

The auxiliary storage device 403 stores a registration program to cause a computer to function as the acceptance unit 410, the generating unit 420, and the registration unit 430. The registration program is loaded into the memory 402 and executed by the processor 401.

The auxiliary storage device 403 further stores an OS. At least part of the OS is loaded into the memory 402 and executed by the processor 401.

The processor 401 executes the registration program while executing the OS.

Input data and output data of the registration program are stored in a storage unit 490.

The auxiliary storage device 403 functions as the storage unit 490. However, a storage device such as the memory 402, a register in the processor 401, and a cache memory in the processor 401 may function as the storage unit 490 in place of the auxiliary storage device 403 or together with the auxiliary storage device 403.

The registration device 400 may include a plurality of processors as an alternative to the processor 401. The plurality of processors share the functions of the processor 401.

The registration program can be recorded (stored) in a computer readable format in a non-volatile recording medium such as an optical disc or a flash memory.

Figure 5:
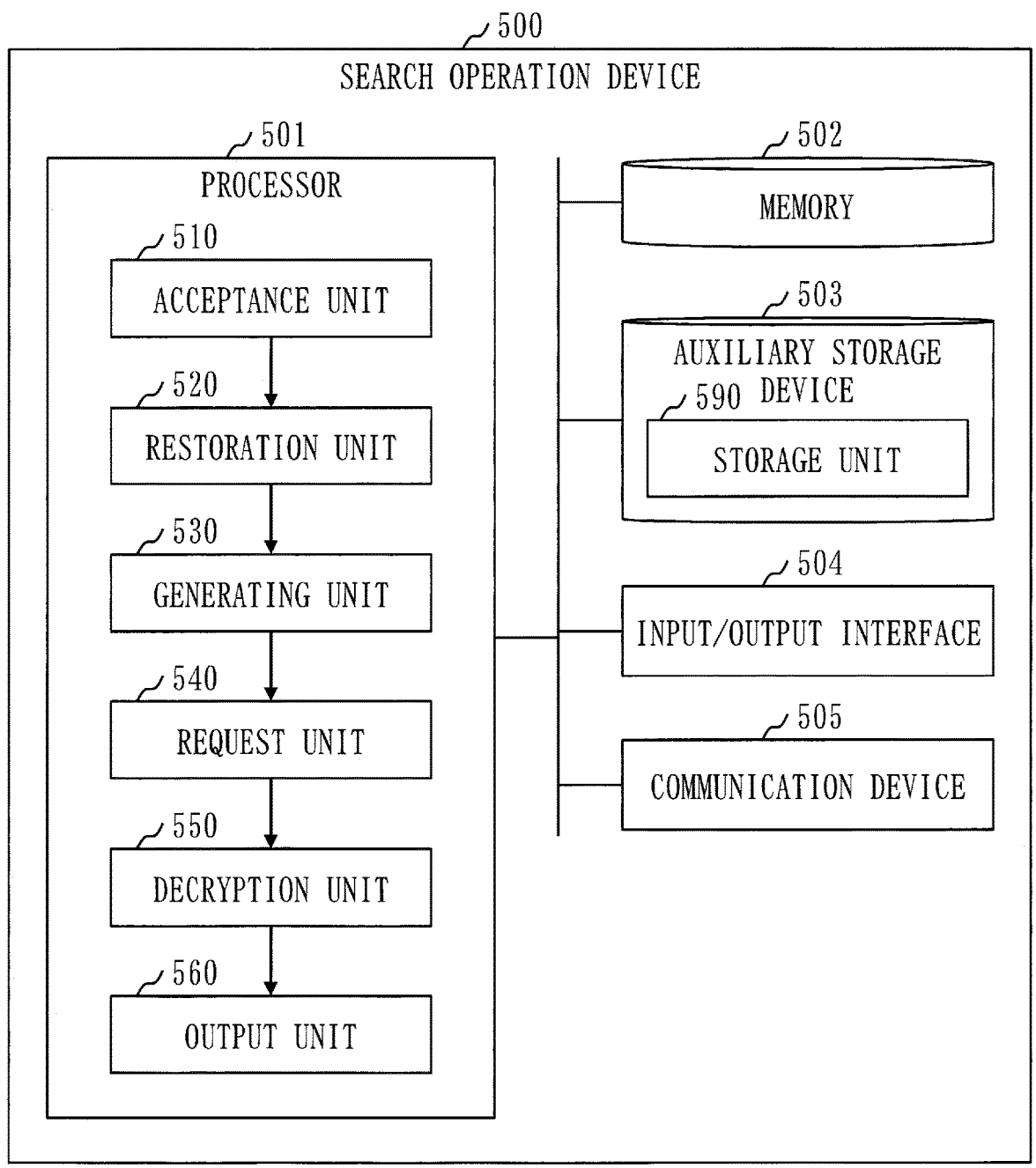
FIG. 5 is a configuration diagram of a search operation device 500 in Embodiment 1.

Based on FIG. 5, a configuration of the search operation device 500 will be described.

The search operation device 500 is a computer that includes hardware such as a processor 501, a memory 502, an auxiliary storage device 503, an input/output interface 504, and a communication device 505. These hardware components are connected with one another through signal lines.

The processor 501 is an IC that performs operational processing, and controls other hardware components. For example, the processor 501 is a CPU, a DSP, or a GPU.

The memory 502 is a volatile or non-volatile storage device. The memory 502 is also called a main storage device or a main memory. For example, the memory 502 is a RAM. Data stored in the memory 502 is saved in the auxiliary storage device 503 as necessary.

The auxiliary storage device 503 is a non-volatile storage device. For example, the auxiliary storage device 503 is a ROM, an HDD, or a flash memory. Data stored in the auxiliary storage device 503 is loaded into the memory 502 as necessary.

The input/output interface 504 is a port to which an input device and an output device are connected. For example, the input/output interface 504 is a USB terminal, the input device is a keyboard and a mouse, and the output device is a display. Input to and output from the search operation device 500 are performed using the input/output interface 504.

The communication device 505 is a receiver and a transmitter. For example, the communication device 505 is a communication chip or a NIC. Communication of the search operation device 500 is performed using the communication device 505.

The search operation device 500 includes elements such as an acceptance unit 510, a restoration unit 520, a generating unit 530 (search query generating unit), a request unit 540, a decryption unit 550, and an output unit 560 (search result output unit). These elements are realized by software.

The auxiliary storage device 503 stores a search operation program to cause a computer to function as the acceptance unit 510, the restoration unit 520, the generating unit 530, the request unit 540, the decryption unit 550, and the output unit 560. The search operation program is loaded into the memory 502 and executed by the processor 501.

The auxiliary storage device 503 further stores an OS. At least part of the OS is loaded into memory 502 and executed by the processor 501.

The processor 501 executes the search operation program while executing the OS.

Input data and output data of the search operation program are stored in a storage unit 590.

The auxiliary storage device 503 functions as the storage unit 590. However, a storage device such as the memory 502, a register in the processor 501, and a cache memory in the processor 501 may function as the storage unit 590 in place of the auxiliary storage device 503 or together with the auxiliary storage device 503.

The search operation device 500 may include a plurality of processors as an alternative to the processor 501. The plurality of processors share the functions of the processor 501.

The search operation program can be recorded (stored) in a computer readable format in a non-volatile recording medium such as an optical disc or a flash memory.

Figure 6:
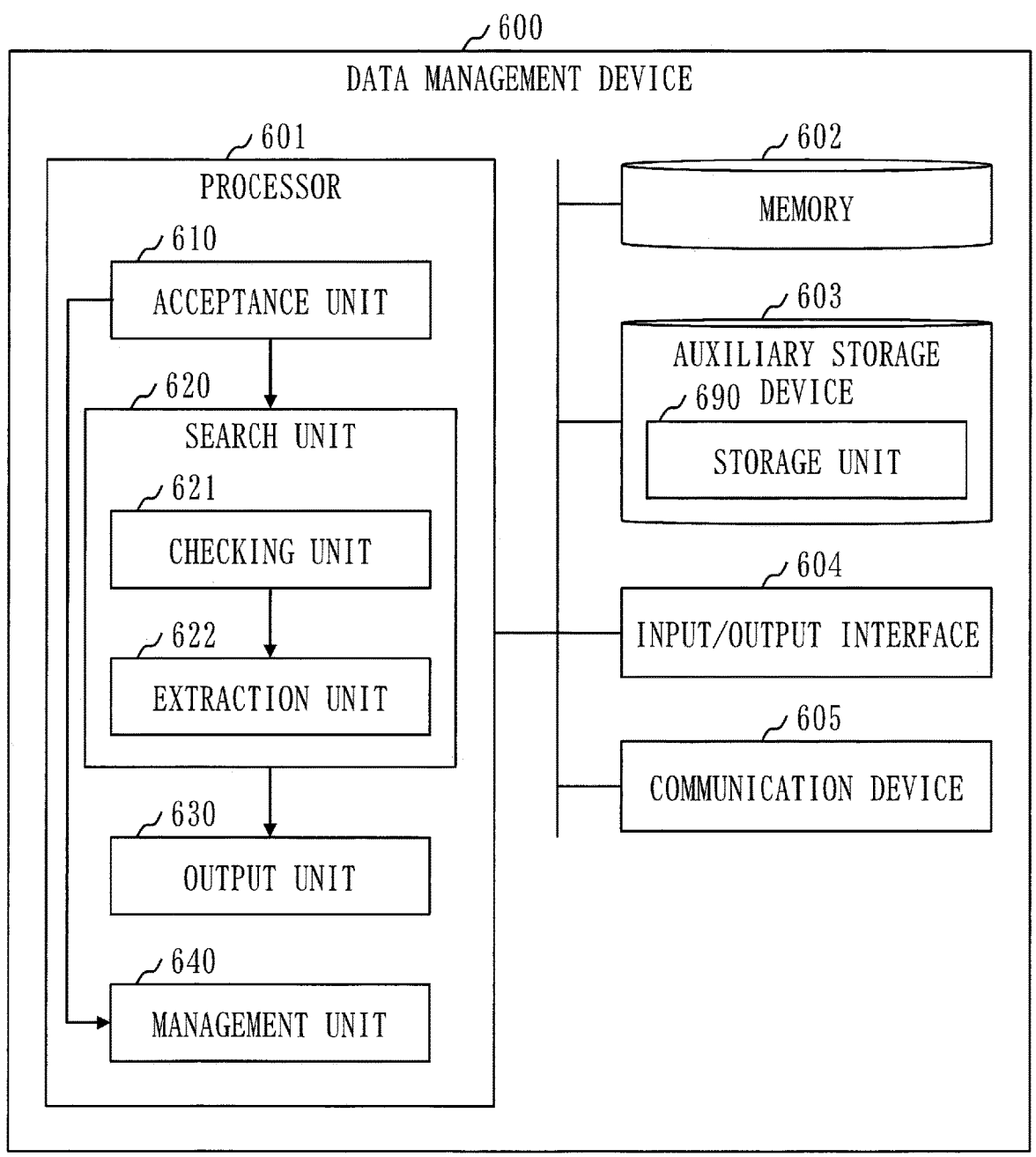
FIG. 6 is a configuration diagram of a data management device 600 in Embodiment 1.

Based on FIG. 6, a configuration of the data management device 600 will be described.

The data management device 600 is a computer that includes hardware such as a processor 601, a memory 602, an auxiliary storage device 603, an input/output interface 604, and a communication device 605. These hardware components are connected with one another through signal lines.

The processor 601 is an IC that performs operational processing, and controls other hardware components. For example, the processor 601 is a CPU, a DSP, or a GPU.

The memory 602 is a volatile or non-volatile storage device. The memory 602 is also called a main storage device or a main memory. For example, the memory 602 is a RAM. Data stored in the memory 602 is saved in the auxiliary storage device 603 as necessary.

The auxiliary storage device 603 is a non-volatile storage device. For example, the auxiliary storage device 603 is a ROM, an HDD, or a flash memory. Data stored in the auxiliary storage device 603 is loaded into the memory 602 as necessary.

The input/output interface 604 is a port to which an input device and an output device are connected. For example, the input/output interface 604 is a USB terminal, the input device is a keyboard and a mouse, and the output device is a display. Input to and output from the data management device 600 are performed using the input/output interface 604.

The communication device 605 is a receiver and a transmitter. For example, the communication device 605 is a communication chip or a NIC. Communication of the data management device 600 is performed using the communication device 605.

The data management device 600 includes elements such as an acceptance unit 610, a search unit 620, an output unit 630 (encrypted search result output unit), and a management unit 640. These elements are realized by software.

The search unit 620 includes elements such as a checking unit 621 and an extraction unit 622.

The auxiliary storage device 603 stores a data management program to cause a computer to function as the acceptance unit 610, the search unit 620, the output unit 630, and the management unit 640. The data management program is loaded into the memory 602 and executed by the processor 601.

The auxiliary storage device 603 further stores an OS. At least part of the OS is loaded into the memory 602 and executed by the processor 601.

The processor 601 executes the data management program while executing the OS.

Input data and output data of the data management program are stored in a storage unit 690.

The auxiliary storage device 603 functions as the storage unit 690. However, a storage device such as the memory 602, a register in the processor 601, and a cache memory in the processor 601 may function as the storage unit 690 in place of the auxiliary storage device 603 or together with the auxiliary storage device 603.

The data management device 600 may include a plurality of processors as an alternative to the processor 601. The plurality of processors share the functions of the processor 601.

The data management program can be recorded (stored) in a computer readable format in a non-volatile recording medium such as an optical disc or a flash memory.

*Description of Operation*

A procedure for operation of the searchable encryption system 100 is equivalent to a searchable encryption method. The procedure for operation of the searchable encryption system 100 is also equivalent to a procedure for processing by a searchable encryption program.

Figure 7:
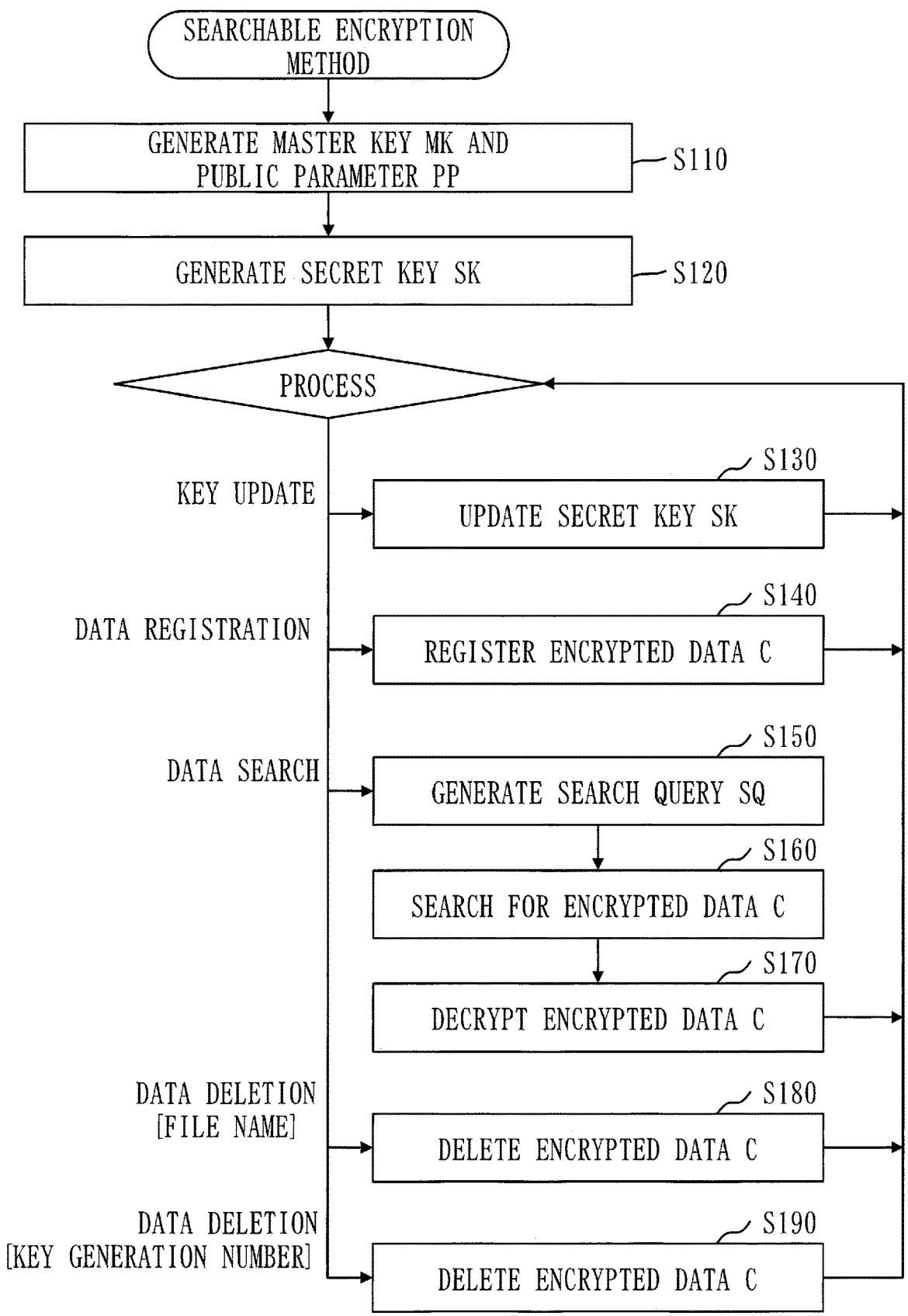
FIG. 7 is a flowchart of a searchable encryption method in Embodiment 1.

Based on FIG. 7, the searchable encryption method will be described.

In step S110, the master key device 200 generates a master key MK and a public parameter PP.

Figure 8:
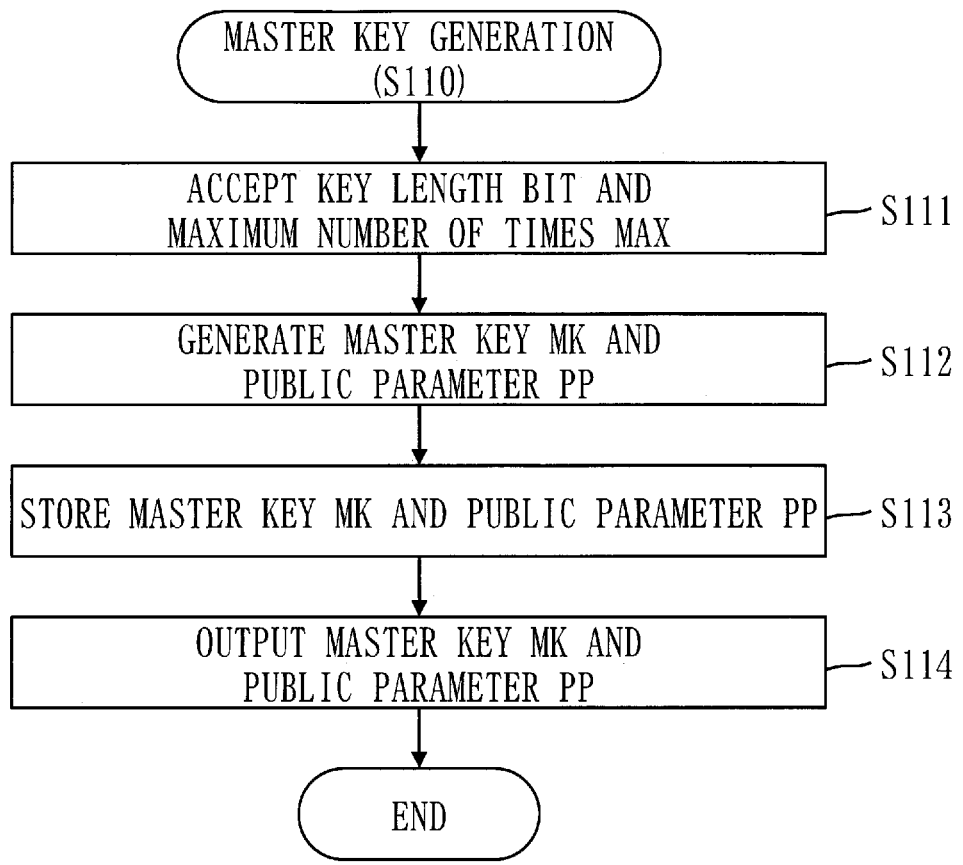
FIG. 8 is a flowchart of master key generation (S110) in Embodiment 1.

Based on FIG. 8, a procedure for master key generation (S110) will be described.

The master key generation (S110) is a process executed by the master key device 200.

In step S111, the acceptance unit 210 accepts a key length BIT and a maximum number of times MAX.

The key length BIT is the length of the master key MK, and is represented by a positive integer (natural number).

The maximum number of times MAX is the maximum value of the number of times a secret key SK is updated, and is represented by a positive integer.

In step S112, the generating unit 220 generates the master key MK based on the key length BIT.

Specifically, the generating unit 220 generates a random number R with the same bit length as the key length BIT. The generated random number R is the master key MK. The master key MK is expressed as indicated below.

$$MK=R$$

Furthermore, the generating unit 220 generates the public parameter PP, using the maximum number of times MAX. The public parameter PP is generated as described below.

First, the generating unit 220 selects a common-key encryption scheme E. Specific examples of the common-key encryption scheme E are AES-CTR and AES-CBC.

The generating unit 220 also selects a cryptographic function F. The cryptographic function F is a cryptographic hash function. Specific examples of the cryptographic function F are SHA-256 and SHA-512.

Then, the generating unit 220 generates a parameter including an identifier of the common-key encryption scheme E, an identifier of the cryptographic function F, and the maximum number of times MAX. The generated parameter is the public parameter PP.

The public parameter PP is expressed as indicated below.

$$PP=(E,F,MAX)$$

AES is an abbreviation for Advanced Encryption Standard.

CTR is an abbreviation for counter.

CBC is an abbreviation for cipher block chaining.

SHA is an abbreviation for Secure Hash Algorithm.

In step S113, the generating unit 220 stores and keeps the master key MK and the public parameter PP in the storage unit 290.

In step S114, the output unit 230 outputs the master key MK.

For example, the output unit 230 transmits the master key MK to the secret key device 300, using the communication device 205.

The master key MK is used to generate the secret key SK.

Furthermore, the output unit 230 outputs the public parameter PP.

For example, the output unit 230 transmits the public parameter PP to each of the secret key device 300, the registration device 400, the search operation device 500, and the data management device 600, using the communication device 205.

The public parameter PP is used to generate the secret key SK, update the secret key SK, register encrypted data C, search for the encrypted data C, decrypt the encrypted data C, and generate a search query SQ.

Referring back to FIG. 7, the description will be continued from step S120.

In step S120, the secret key device 300 generates the secret key SK.

The secret key SK is a key (common key) of the common-key scheme.

Figure 9:
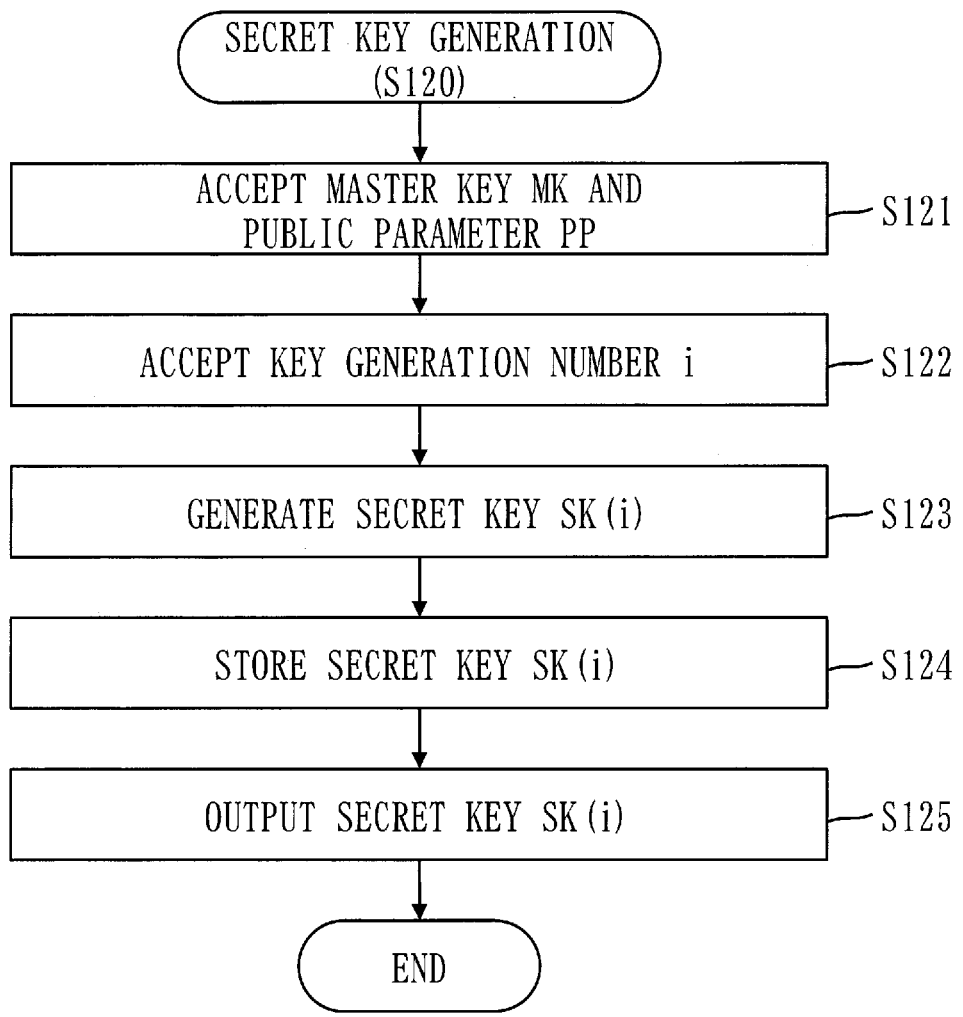
FIG. 9 is a flowchart of secret key generation (S120) in Embodiment 1.

Based on FIG. 9, a procedure for secret key generation (S120) will be described.

The secret key generation (S120) is a process executed by the secret key device 300.

In step S121, the acceptance unit 310 accepts the master key MK and the public parameter PP, and stores and keeps the master key MK and the public parameter PP in the storage unit 390.

However, if the master key MK and the public parameter PP are already stored, step S121 is unnecessary.

In step S122, the acceptance unit 310 accepts a key generation number i, and stores and keeps the key generation number i in the storage unit 390.

However, if a secret key SK(i−1) is stored, the key generation number i can be obtained by adding 1 to the key generation number (i−1) of the secret key SK(i−1), so that step S122 is unnecessary.

The key generation number i is the number to identify the generation of the secret key SK, and is represented by a positive integer.

A secret key SK(i) is the secret key SK of the generation identified by the key generation number i. When the key generation number i is not specified, the secret key is denoted simply as "SK".

In step S123, the generating unit 320 generates the secret key SK(i), using the master key MK, the public parameter PP and the key generation number i.

The secret key SK(i) includes a data key DK(i), a keyword key KK(i), and the key generation number i. When the key generation number i is not specified, the data key is denoted simply as "DK", and the keyword key is denoted simply as "KK".

The data key DK is a secret key for data.

The keyword key KK is a secret key for a keyword.

The secret key SK(i) is expressed as indicated below.

$$SK(i)=(DK(i),KK(i),i)$$

The data key DK(i) and the keyword key KK(i) are expressed as indicated below.

$$DK(i)=F^{(MAX-i+1)}(R\|0)$$

$$KK(i)=F^{(MAX-i+1)}(R\|1))$$

The identifier of the cryptographic function F is included in the public parameter PP.

$F^n(X)$ means that the cryptographic function F is repeated n times for an input value X, that is, multiple encryption. The input value X is the input value of the cryptographic function F of the first time, and the output value of the cryptographic function F of a preceding time is the input value of the cryptographic function F of a next time. $F^n(X)$ is expressed a follows: $F^n(X)=F(F( \ldots (F(X)) \ldots ))$.

The maximum number of times MAX is included in the public parameter PP.

"R" is equal to the master key MK.

"||" means concatenation of data.

However, the data key DK(i) and the keyword key KK(i) may be the same value. For example, the data key DK(i) and the keyword key KK(i) may be expressed as indicated below.

$$DK(i)=KK(i)=F^{(MAX-i+1)}(R)$$

The generating unit 320 may delete the master key MK, the public parameter PP, and the key generation number i from the storage unit 390.

In step S124, the generating unit 320 stores and keeps the secret key SK(i) in the storage unit 390.

If a secret key SK(j) is kept in the storage unit 390, the generating unit 320 may delete the secret key SK(j) from the storage unit 390. The secret key SK(j) is the secret key of a generation older than the i-th generation. "j" is an integer equal to or smaller than (i−1).

In step S125, the output unit 330 outputs the secret key SK(i).

For example, the output unit 330 transmits the secret key SK(i) to each of the registration device 400 and the search operation device 500, using the communication device 305.

The secret key SK is used to generate encrypted data C, generate a search query SQ, and decrypt the encrypted data C.

Referring back to FIG. 7, the description will be continued from step S130.

Step S130, step S140, steps S150 to S170, step S180, or step S190 is executed repeatedly.

If the secret key SK is to be updated, the process proceeds to step S130.

For example, the secret key device 300 regularly compares the usage period of the secret key SK with a reference period. If the usage period of the secret key SK exceeds the reference period, the process proceeds to step S130.

For example, if an administrator determines that the secret key SK has leaked and inputs an update instruction for the secret key SK to the secret key device 300, the process proceeds to step S130.

If encrypted data C is to be registered, the process proceeds to step S140.

For example, if a user inputs a registration instruction for the encrypted data C to the registration device 400, the process proceeds to step S140.

If a search for encrypted data C is to be performed, the process proceeds to step S150.

For example, if a user inputs a search instruction for the encrypted data C to the search operation device 500, the process proceeds to step S150.

If encrypted data C is to be deleted based on the file name, the process proceeds to step S180.

If encrypted data C is to be deleted based on the key generation number i, the process proceeds to step S190.

In step S130, the secret key device 300 updates the secret key SK. In other words, the secret key device 300 generates a secret key SK of a new generation. Specifically, if the current secret key SK is the secret key SK(i), the secret key device 300 generates a secret key SK(i+1).

The method for generating the secret key SK is as described in the secret key generation (S120).

In step S140, the registration device 400 generates encrypted data C, and registers the encrypted data C in the data management device 600.

Figure 10:
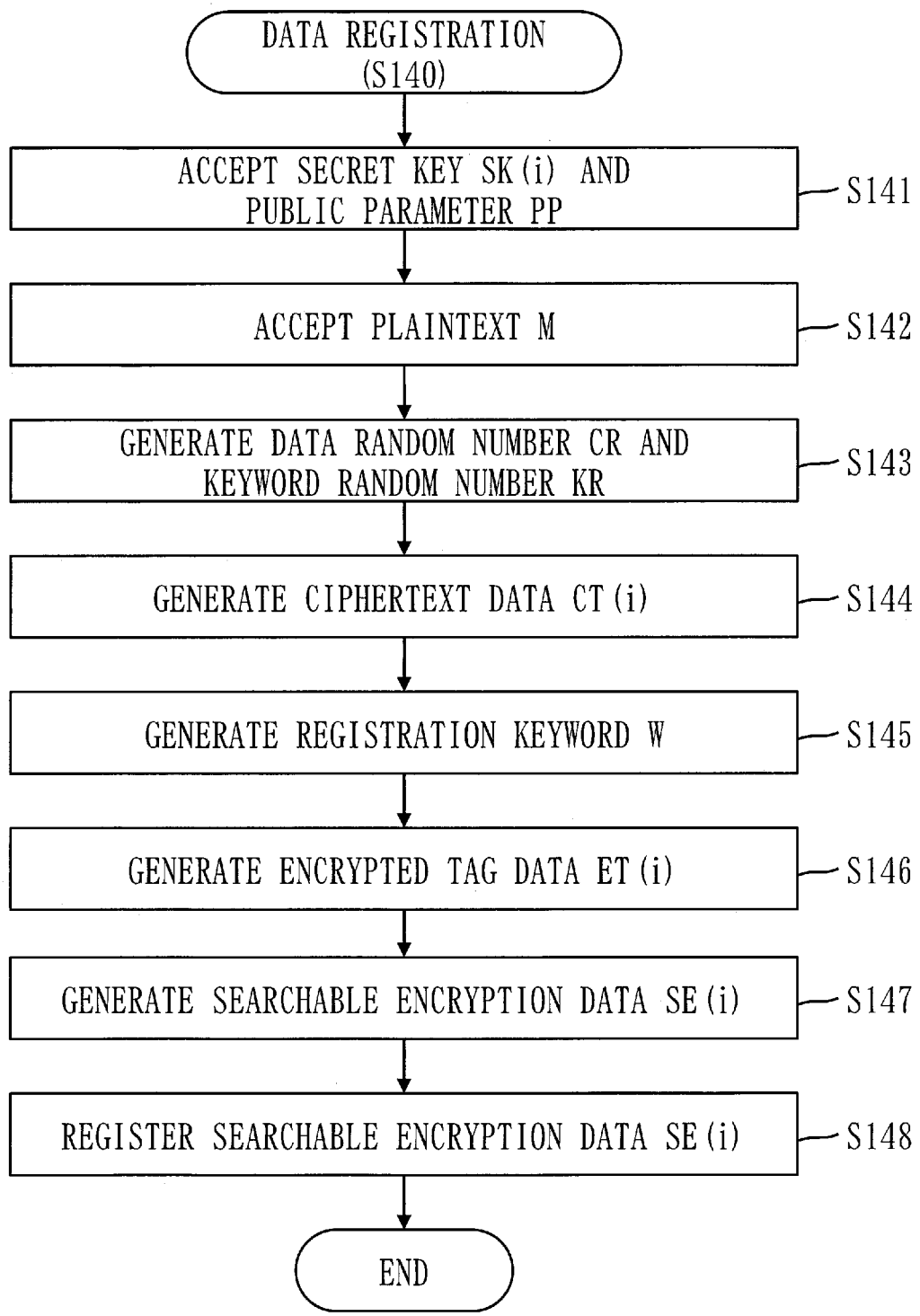
FIG. 10 is a flowchart of data registration (S140) in Embodiment 1.

Based on FIG. 10, a procedure for data registration (S140) will be described.

The data registration (S140) is a process executed by the registration device 400.

In step S141, the acceptance unit 410 accepts the secret key SK(i) and the public parameter PP, and stores and keeps the secret key SK(i) and the public parameter PP in the storage unit 490.

If the secret key SK(i) and the public parameter PP are already kept, step S141 is unnecessary.

If the secret key SK(j) is kept in the storage unit 490, the acceptance unit 410 may delete the secret key SK(j) from the storage unit 490. The secret key SK(j) is the secret key of a generation older than the i-th generation. "j" is an integer equal to or smaller than (i−1).

In step S142, the acceptance unit 410 accepts a plaintext M.

The plaintext M is data that has not been encrypted.

The plaintext M includes a file name File(M) as metadata.

A plurality of plaintexts M may be accepted. In that case, steps S143 to S146 are executed for each plaintext M.

In step S143, the random number generating unit 421 generates a data random number CR and a keyword random number KR.

The data random number CR is a random number for encrypting the plaintext M.

The keyword random number KR is a random number for encrypting a registration keyword W to be described later.

Specifically, the random number generating unit 421 generates one random number to be used in the common-key encryption scheme E or the searchable encryption scheme. The generated random number is the data random number CR. The identifier of the common-key encryption scheme E is included in the public parameter PP. For example, when the common-key encryption scheme E is AES-CTR, IV is the data random number CR.

The random number generating unit 421 also generates at least one random number to be used in the searchable encryption scheme. The generated random number is the keyword random number KR.

In S144, the ciphertext data generating unit 422 encrypts the plaintext M, using the secret key SK(i), the public parameter PP, and the data random number CR. As a result, ciphertext data CT(i) is generated.

The ciphertext data CT(i) includes a ciphertext C and the key generation number i.

The ciphertext C is the plaintext M that has been encrypted.

The ciphertext data CT(i) is expressed as indicated below.

$$CT(i)=(C,i)$$

For example, the ciphertext C is expressed as indicated below.

$$C=E(DK(i),M,CR)$$

E(X) denotes an output value of a cryptographic function for the input value X.

The data key DK(i) is included in the secret key SK(i)

In step S145, the keyword generating unit 423 generates the registration keyword W.

The registration keyword W is a keyword related to the plaintext M.

Specifically, the keyword generating unit 423 extracts a keyword from the plaintext M by performing morphological analysis, natural language processing, or the like on the plaintext M. The extracted keyword is the registration keyword W.

A plurality of registration keywords W may be generated. In this case, an encrypted tag to be described later is generated for each registration keyword W.

Instead of generating the registration keyword W by the keyword generating unit 423, the acceptance unit 410 may accept, via the input/output interface 404, the registration keyword W that is input to the registration device 400.

In step S146, the encrypted tag generating unit 424 encrypts the registration keyword W to generate encrypted tag data ET(i), using the secret key SK(i), the public parameter PP, and the keyword random number KR.

The encrypted tag data ET(i) includes an encrypted tag ET and the key generation number i.

The encrypted tag ET includes an encrypted keyword EW and the keyword random number KR.

The encrypted keyword EW is the registration keyword W that has been encrypted.

The key generation number i is included in the secret key SK(i).

The encrypted tag data ET(i) is expressed as indicated below.

$$ET(i)=(ET,i)$$

$$ET=(EW,KR)$$

For example, the encrypted keyword EW is expressed as indicated below. In this case, the encrypted tag generating unit 424 encrypts the registration keyword W using the keyword key KK(i), and encrypts the encrypted registration keyword W using the keyword random number KR. As a result, the encrypted keyword EW is generated.

$$EW=F(F(KK(i)\|W)\|KR)$$

The identifier of the cryptographic function F is included in the public parameter PP.

The keyword key KK(i) is included in the secret key SK(i).

If there are a plurality of registration keywords W, the encrypted tag ET includes the encrypted tags individually corresponding to the registration keywords W.

For example, if there are a registration keyword W1 and a registration keyword W2, the encrypted tag ET is expressed as indicated below.

$$ET=(F(F(KK(i)\|W1)\|KR),F(F(KK(i)\|W2)\|KR),KR)$$

In step S147, the registration unit 430 generates searchable encryption data SE(i).

The searchable encryption data SE(i) includes the file name File(M), the ciphertext data CT(i), the encrypted tag data ET(i), and the key generation number i.

That is, the searchable encryption data SE(i) is a set of the file name File(M), the ciphertext data CT(i), the encrypted tag data ET(i), and the key generation number i.

The searchable encryption data SE(i) is expressed as indicated below.

$$SE(i)=(File(M),CT(i),ET(i),i)$$

In step S148, the registration unit 430 registers the searchable encryption data SE(i) in a registration database 691.

The registration database 691 is stored and kept in the storage unit 690 of the data management device 600.

Specifically, the registration unit 430 transmits the searchable encryption data SE(i) to the data management device 600, using the communication device 405. In the data management device 600, the acceptance unit 610 receives the searchable encryption data SE(i), using the communication device 605. Then, the management unit 640 registers the searchable encryption data SE(i) in the registration database 691.

FIG. 11 illustrates an example of the registration database 691.

In FIG. 11, data in one row is equivalent to one piece of the searchable encryption data SE(i).

In the data in one row, the file name File(M), the ciphertext data CT(i), the encrypted tag ET(i), and the key generation number i are associated with one another.

Referring back to FIG. 7, step S150 will be described.

In step S150, the search operation device 500 generates a search query SQ, and transmits the search query SQ to the data management device 600.

Figure 12:
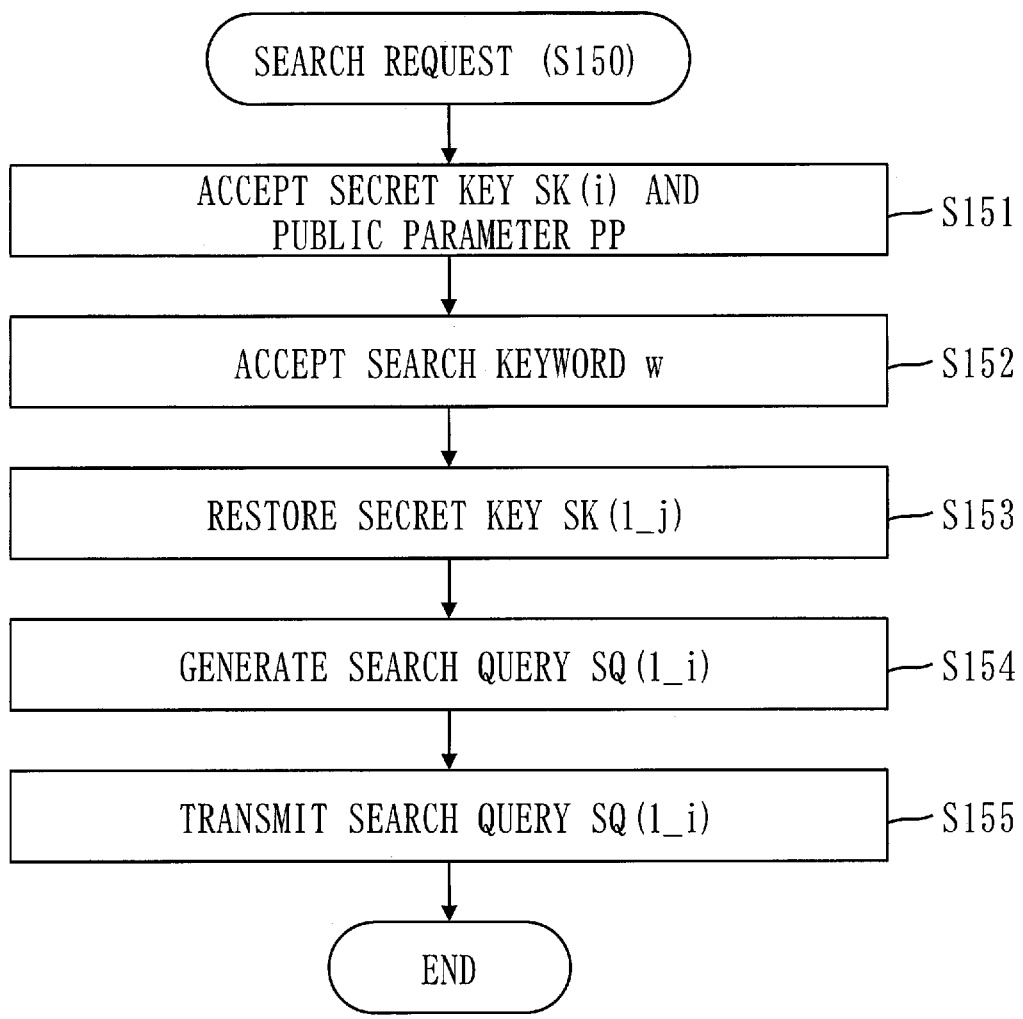
FIG. 12 is a flowchart of search request (S150) in Embodiment 1.

Based on FIG. 12, a procedure for search request (S150) will be described. The search request (S150) is a process executed by the search operation device 500.

In step S151, the acceptance unit 510 accepts the secret key SK(i) and the public parameter PP, and stores and keeps the secret key SK(i) and the public parameter PP in the storage unit 290.

If the secret key SK(i) and the public parameter PP are already kept, step S151 is unnecessary.

If the secret key SK(j) is already kept in the storage unit 590, the acceptance unit 510 may delete the secret key SK(j) from the storage unit 590. The secret key SK(j) is the secret key of a generation older than the i-th generation. "j" is an integer equal to or smaller than (i−1).

In step S152, the acceptance unit 510 accepts a search keyword w.

In step S153, the restoration unit 520 restores a secret key SK(1_j), using the secret key SK(i) and the public parameter PP.

"1_j" means integers equal to or greater than 1 and not greater than (i−1).

The secret key SK(1_j) is expressed as indicated below.

$$SK(1\_j)=(SK(1),\ldots,SK(i-2),SK(i-1))$$

The secret key SK(1_j) is restored as described below.
First, the restoration unit 520 restores a data key DK(1_j).
The data key DK(1_j) is expressed as indicated below.

$$DK(1\_j)=(DK(1), \ldots ,DK(i-2),DK(i-1))$$

$$DK(i-1)=F(DK(i))=F(F^{(MAX-i+1)}(R\|0))$$

$$DK(i-2)=F^2(DK(i))=F^2(F^{(MAX-i+1)}(R\|0))$$

$$DK(1)=F^{(i-1)}(DK(i))=F^{(i-1)}(F^{(MAX-i+1)}(R\|0))$$

DK(i−3) to DK(2) are calculated similarly to DK(i−2).
The data key DK(i) is included in the secret key SK(i).
The cryptographic function F is included in the public parameter PP.
The maximum number of times MAX is included in the public parameter PP.
The restoration unit 520 also restores a keyword key KK(1_j).
The keyword key KK(1_j) is expressed as indicated below.

$$KK(1\_j)=(KK(1), \ldots ,KK(i-2),KK(i-1))$$

$$KK(i-1)=F(KK(i))=F(F^{(MAX-i+1)}(R\|1))$$

$$KK(i-2)=F^2(KK(i))=F^2(F^{(MAX-i+1)}(R\|1))$$

$$KK(1)=F^{(i-1)}(DK(i))=F^{(i-1)}(F^{(MAX-i+1)}(R\|1))$$

KK(i−3) to KK(2) are calculated similarly to KK(i−2).
The keyword key KK(i) is included in the secret key SK(i).
Then, the restoration unit 520 generates the secret key SK of each generation of the first generation to the (i−1)-th generation.
A secret key SK(n) is expressed as indicated below. The secret key SK(n) is the secret key SK of the n-th generation.

$$SK(n)=(DK(n),KK(n),n)$$

In step S154, the generating unit 530 generates a search query SQ(1_i), using the secret key SK(1_i), the public parameter PP, and the search keyword w.
"1_i" means an integer equal to or greater than 1 and not greater than i.
The secret key SK(1_i) is expressed as indicated below.

$$SK(1\_i)=(SK(1), \ldots ,SK(i))$$

The search query SQ(1_i) includes the search query SQ of each generation of the first generation to the i-th generation.
The search query SQ(1_i) is expressed as indicated below.

$$SQ(1\_i)=(SQ(1), \ldots ,SQ(i))$$

The search query SQ of the n-th generation is the search keyword w that has been encrypted using the secret key SK of the n-th generation.
For example, a search query SQ(n) is expressed as indicated below. The search query SQ(n) is the search query SQ of the n-th generation.

$$SQ(n)=F(KK(n)\|w)$$

The cryptographic function F is included in the public parameter PP.
In step S155, the request unit 540 transmits the search query SQ(1_i) to the data management device 600, using the communication device 505.
Referring back to FIG. 7, step S160 will be described.
In step S160, the data management device 600 searches for encrypted data C that matches the search query SQ.

Figure 13:
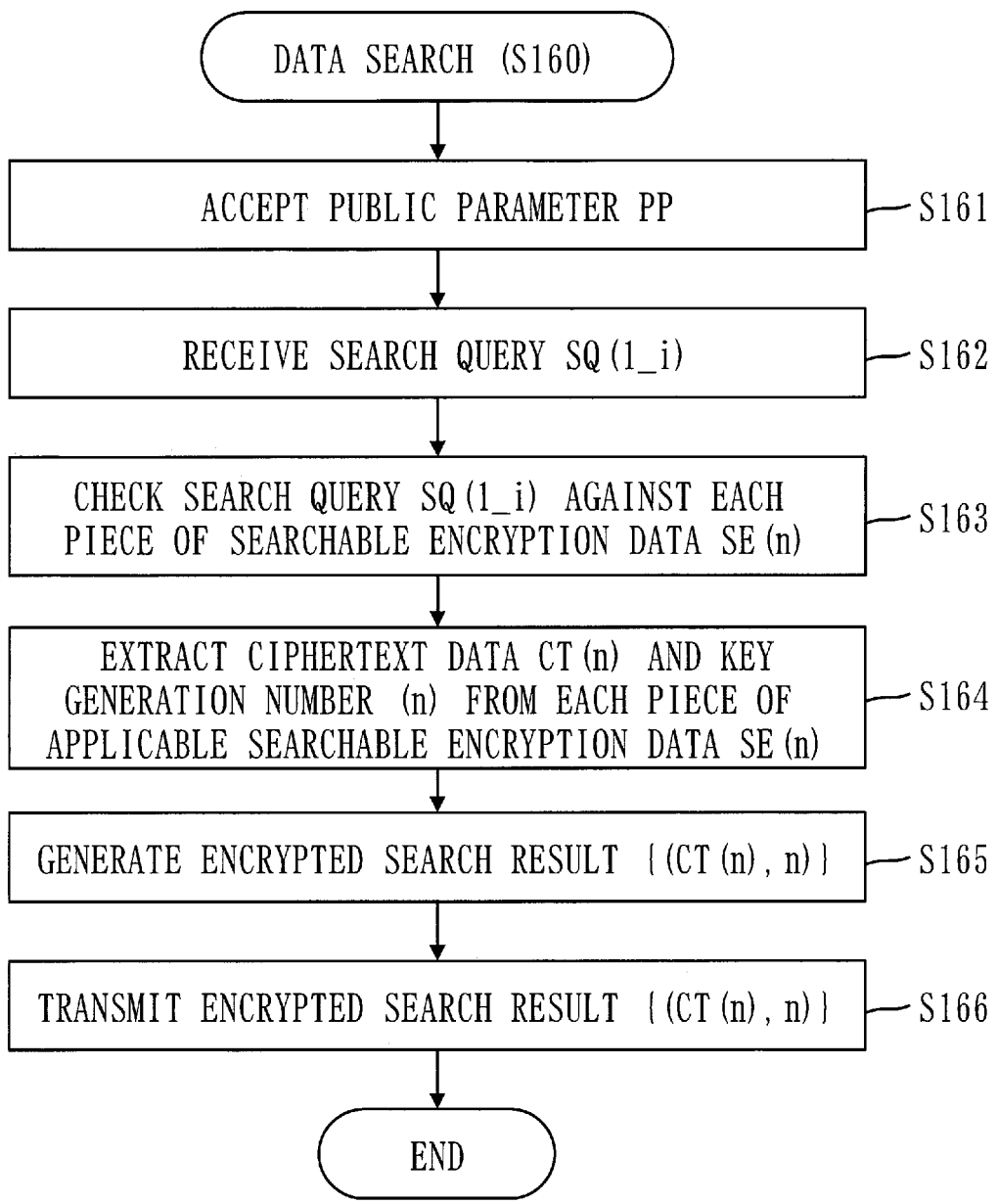
FIG. 13 is a flowchart of data search (S160) in Embodiment 1.

Based on FIG. 13, a procedure for data search (S160) will be described.
The data search (S160) is a process executed by the data management device 600.
In step S161, the acceptance unit 610 accepts the public parameter PP, and stores and keeps the public parameter PP in the storage unit 690.
However, if the public parameter PP is already kept, step S161 is unnecessary.
In step S162, the acceptance unit 610 receives the search query SQ(1_i).
In step S163, the checking unit 621 checks the search query SQ(1_i) against each piece of searchable encryption data SE(n) in the registration database 691 so as to find searchable encryption data SE(n) that matches the search query SQ(1_i).
The searchable encryption data SE(n) means searchable encryption data SE including a key generation number n.
The checking unit 621 checks the search query SQ(1_i) against the searchable encryption data SE(n) as described below.
First, the checking unit 621 determines whether the key generation number n included in the searchable encryption data SE(n) is equal to or smaller than i.
If the key generation number n is equal to or smaller than i, the checking unit 621 extracts the encrypted tag ET from the encrypted tag data ET(n) in the searchable encryption data SE(n), and extracts the encrypted keyword EW and the keyword random number KR from the extracted encrypted tag ET.
Next, the checking unit 621 generates a checking tag Tg(k) for each search query SQ(k) included in the search query SQ(1_i), using the search query SQ(k) and the extracted keyword random number KR. "k" is an integer equal to or greater than 1 and not greater than i.
The checking tag Tg(k) is expressed as indicated below.

$$Tg(k)=F(SQ(k)\|KR)$$

Then, the checking unit 621 compares the checking tag Tg(k) with the extracted encrypted keyword EW, for each search query SQ(k) included in the search query SQ(1_i).
If one of the checking tags Tg(k) matches the extracted encrypted keyword EW, the searchable encryption data SE(n) matches the search query SQ(1_i).
In a case where there are a plurality of encrypted keywords EW, if one of the checking tags Tg(k) matches one of the encrypted keywords EW, the searchable encryption data SE(n) matches the search query SQ(1_i).
The searchable encryption data SE(n) that matches the search query SQ(1_i) is referred to as "applicable searchable encryption data SE(n)". The applicable searchable encryption data SE(n) includes the encrypted tag data ET(n) that matches the search query SQ(1_i).
In step S164, the extraction unit 622 extracts ciphertext data CT(n) and the key generation number n from each piece of the applicable searchable encryption data SE(n).
In step S165, the output unit 630 generates data including a set that includes each set of the ciphertext data CT(n) and the key generation number n. The generated data is an encrypted search result {(CT(n), n)}. {X} denotes a set of data X.
In step S166, the output unit 630 transmits the encrypted search result {(CT(n), n)} to the search operation device 500, using the communication device 605.
Referring back to FIG. 7, step S170 will be described.

In step S170, the search operation device 500 decrypts the plaintext M from the encrypted data C found as a hit in the search.

Figure 14:
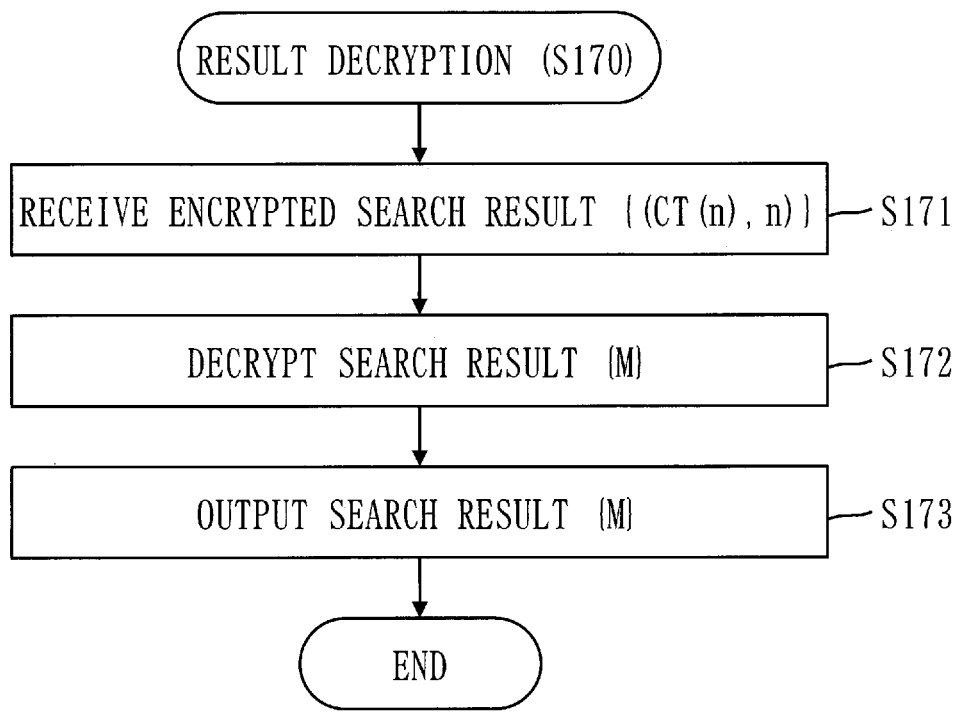
FIG. 14 is a flowchart of result decryption (S170) in Embodiment 1.

Based on FIG. 14, a procedure for result decryption (S170) will be described.

The result decryption (S170) is a process executed by the search operation device 500.

In step S171, the request unit 540 receives the encrypted search result {(CT(n), n)}, using the communication device 505.

In step S172, the decryption unit 550 decrypts a search result {M} from the encrypted search result {(CT(n), n)}, using the secret key SK(n) and the public parameter PP.

The search result {M} is a set of the plaintext M.

For example, the plaintext M included in the search result {M} is expressed as indicated below.

$$M=D(DK(n),CT(n))$$

"D" is a decryption function used in the common-key encryption scheme E.

The identifier of the common-key encryption scheme E is included in the public parameter PP.

The data key DK(n) is included in the secret key SK(n).

However, if the encrypted search result {(CT(n), n)} is an empty set, that is, if there is no (CT(n), n) found as a hit in the search using the search query SQ, step S172 is unnecessary.

In step S173, the output unit 560 outputs the search result {M}.

For example, the output unit 560 displays the search result {M} on a display via the input/output interface 504.

However, if the encrypted search result {(CT(n), n)} is an empty set, the output unit 560 outputs a search error message.

The search error message indicates that there is no plaintext M found as a hit in a search using searchable encryption.

Referring back to FIG. 7, step S180 will be described.

In step S180, the data management device 600 deletes encrypted data C corresponding to a deletion file name.

Figure 15:
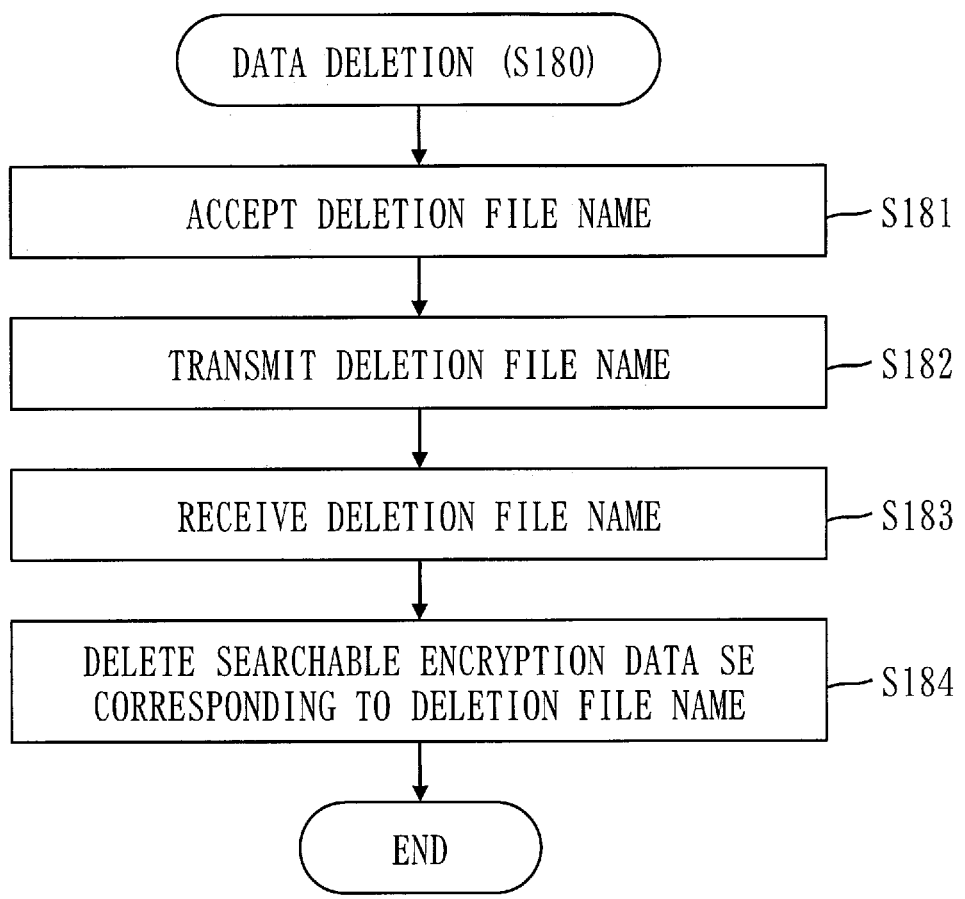
FIG. 15 is a flowchart of data deletion (S180) in Embodiment 1.

Based on FIG. 15, a procedure for data deletion (S180) will be described.

The data deletion (S180) is a process executed by the registration device 400 and the data management device 600. However, the search operation device 500 or another device may be used in place of the registration device 400.

In step S181, the acceptance unit 410 of the registration device 400 accepts the deletion file name.

For example, the acceptance unit 410 receives, via the input/output interface 404, the deletion file name input to the registration device 400. Alternatively, the acceptance unit 410 may accept the deletion file name from an application program executed in the registration device 400.

In step S182, the registration unit 430 of the registration device 400 transmits the deletion file name to the data management device 600, using the communication device 405.

In step S183, the acceptance unit 610 of the data management device 600 receives the deletion file name, using the communication device 605.

In step S184, the management unit 640 of the data management device 600 deletes searchable encryption data SE corresponding to the deletion file name from the registration database 691.

Specifically, the management unit 640 deletes the searchable encryption data SE that includes the same file name File(M) as the deletion file name.

Referring back to FIG. 7, step S190 will be described.

In step S190, the data management device 600 deletes encrypted data C corresponding to a deletion key generation number.

Figure 16:
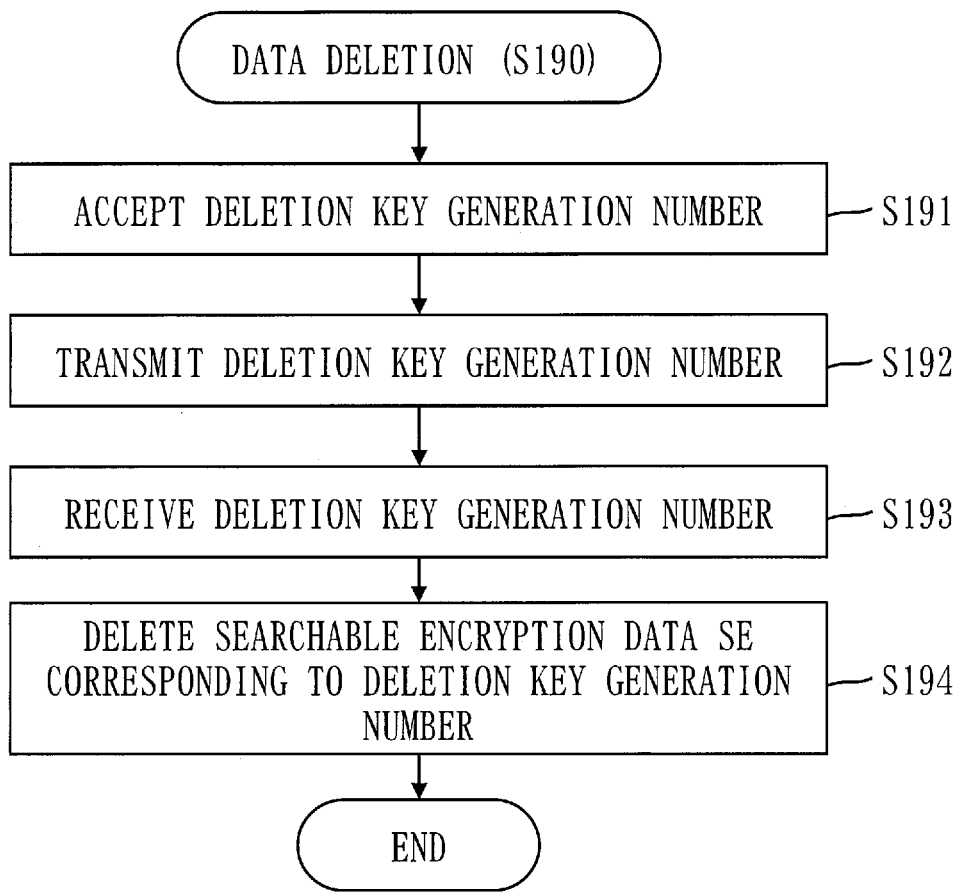
FIG. 16 is flowchart of data deletion (S190) in Embodiment 1.

Based on FIG. 16, a procedure for data deletion (S190) will be described.

The data deletion (S190) is a process executed by the registration device 400 and the data management device 600. However, the search operation device 500 or another device may be used in place of the registration device 400.

In step S191, the acceptance unit 410 of the registration device 400 accepts the deletion key generation number.

For example, the acceptance unit 410 accepts, via the input/output interface 404, the deletion key generation number input to the registration device 400. Alternatively, the acceptance unit 410 may accept the deletion key generation number from an application program executed in the registration device 400.

In step S192, the registration unit 430 of the registration device 400 transmits the deletion key generation number to the data management device 600, using the communication device 405.

In step S193, the acceptance unit 610 of the data management device 600 receives the deletion key generation number, using the communication device 605.

In step S194, the management unit 640 of the data management device 600 deletes searchable encryption data SE corresponding to the deletion key generation number from the registration database 691.

Specifically, the management unit 640 deletes the searchable encryption data SE including the same key generation number as the deletion key generation number.

Effects of Embodiment 1

In Embodiment 1 and the following embodiments, attention is focused on the common-key scheme.

Embodiment 1 allows a key update to be performed using the encrypted tag ET in searchable encryption of the common-key scheme. In addition, the old secret key SK(1_j) can be restored from the new secret key SK(i), and the search query SQ(1_i) can be generated using the entire secret key SK(1_i).

Embodiment 1 allows the key size, the encrypted search keyword size, and the encrypted data size to be configured so as not to be dependent on the maximum number of key updates.

In Embodiment 1, an old secret key is restored from a new secret key based on multiple encryption using a cryptographic function such as a hash function. This makes it possible to generate a key and encrypted data whose sizes are not dependent on the maximum number of key updates.

Embodiment 1 has the following effects.

A keyword search can be performed without decrypting ciphertexts.

A different key can be generated for each key update.

An old key can be restored from a new key. Therefore, the old key can be discarded after a key update.

Encrypted data can be generated without depending on the current number of key updates and the maximum number of key updates. That is, encrypted data whose size is not dependent on these number of times can be generated.

By keeping the key generation number of the secret key used to generate encrypted data in association with the encrypted data, pieces of encrypted data to be searched can be narrowed down. That is, a keyword search can be performed efficiently.

Embodiment 2

With regard to an embodiment in which an encrypted index EI is used in place of the encrypted tag ET, differences from Embodiment 1 will be mainly described based on FIGS. 17 to 23.

\*\*\*Description of Configurations\*\*\*

The configuration of the searchable encryption system 100 is the same as the configuration in Embodiment 1 (see FIG. 1).

However, part of the configuration of the registration device 400 is different from the configuration in Embodiment 1.

Figure 17:
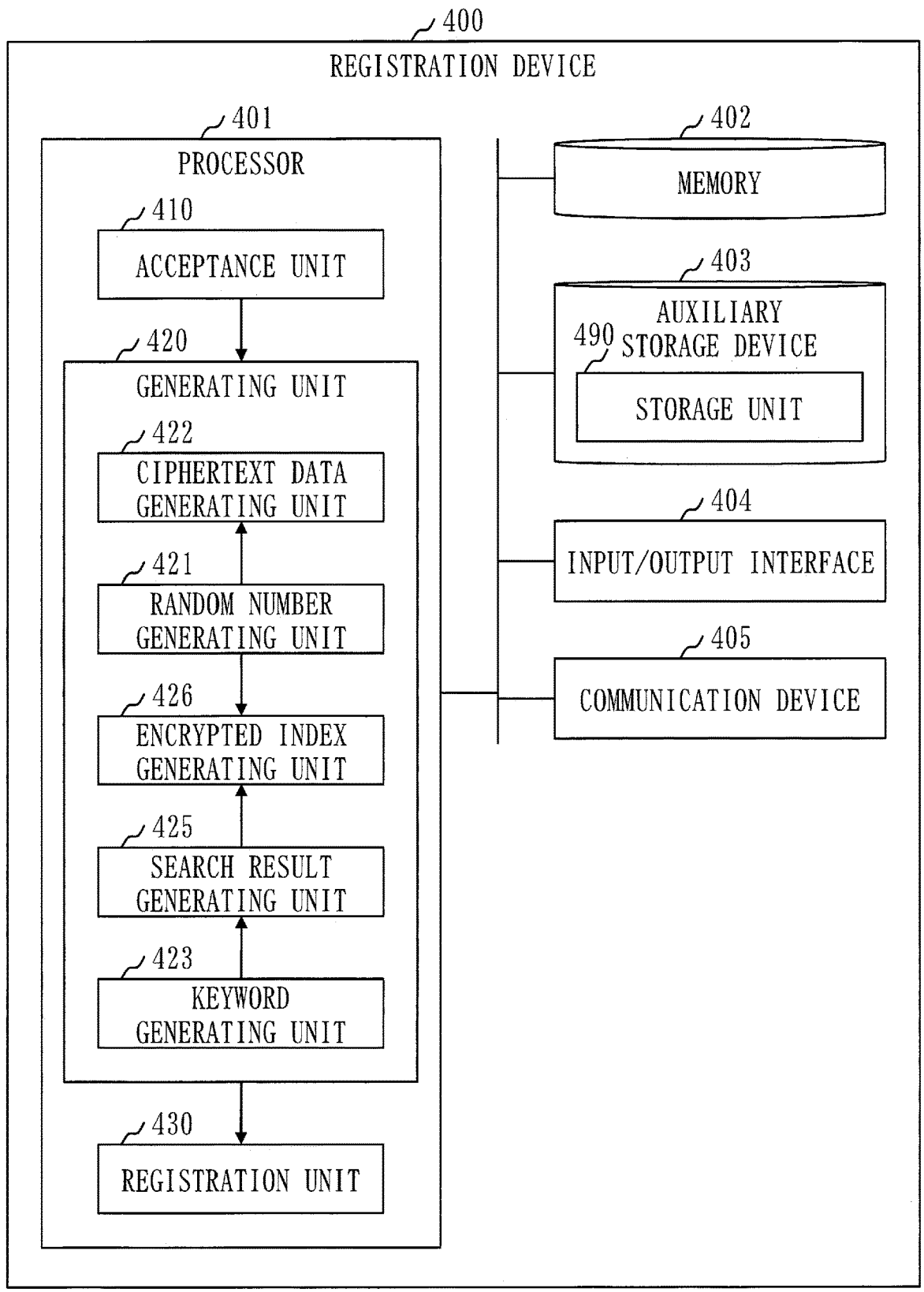
FIG. 17 is a configuration diagram of the registration device 400 in Embodiment 2.

Based on FIG. 17, the configuration of the registration device 400 will be described.

The registration device 400 includes elements such as a search result generating unit 425 and an encrypted index generating unit 426 in place of the encrypted tag generating unit 424 of Embodiment 1.

\*\*\*Description of Operation\*\*\*

Figure 18:
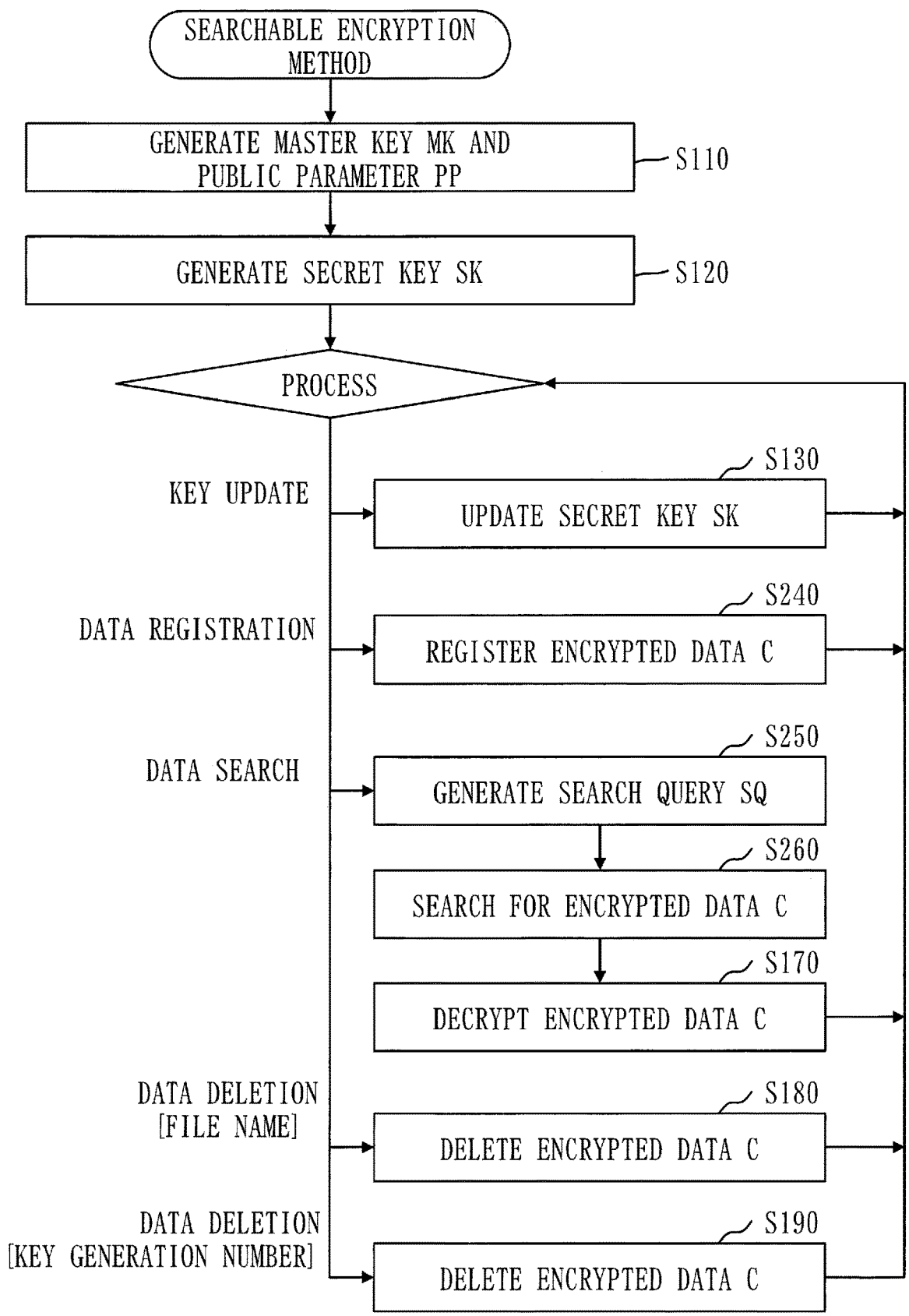
FIG. 18 is a flowchart of the searchable encryption method in Embodiment 2.

Based on FIG. 18, the searchable encryption method will be described.

Steps S110, S120, S130, S170, S180, and S190 are as described in Embodiment 1.

Steps S240, S250, and S260 will be described below.

Figure 19:
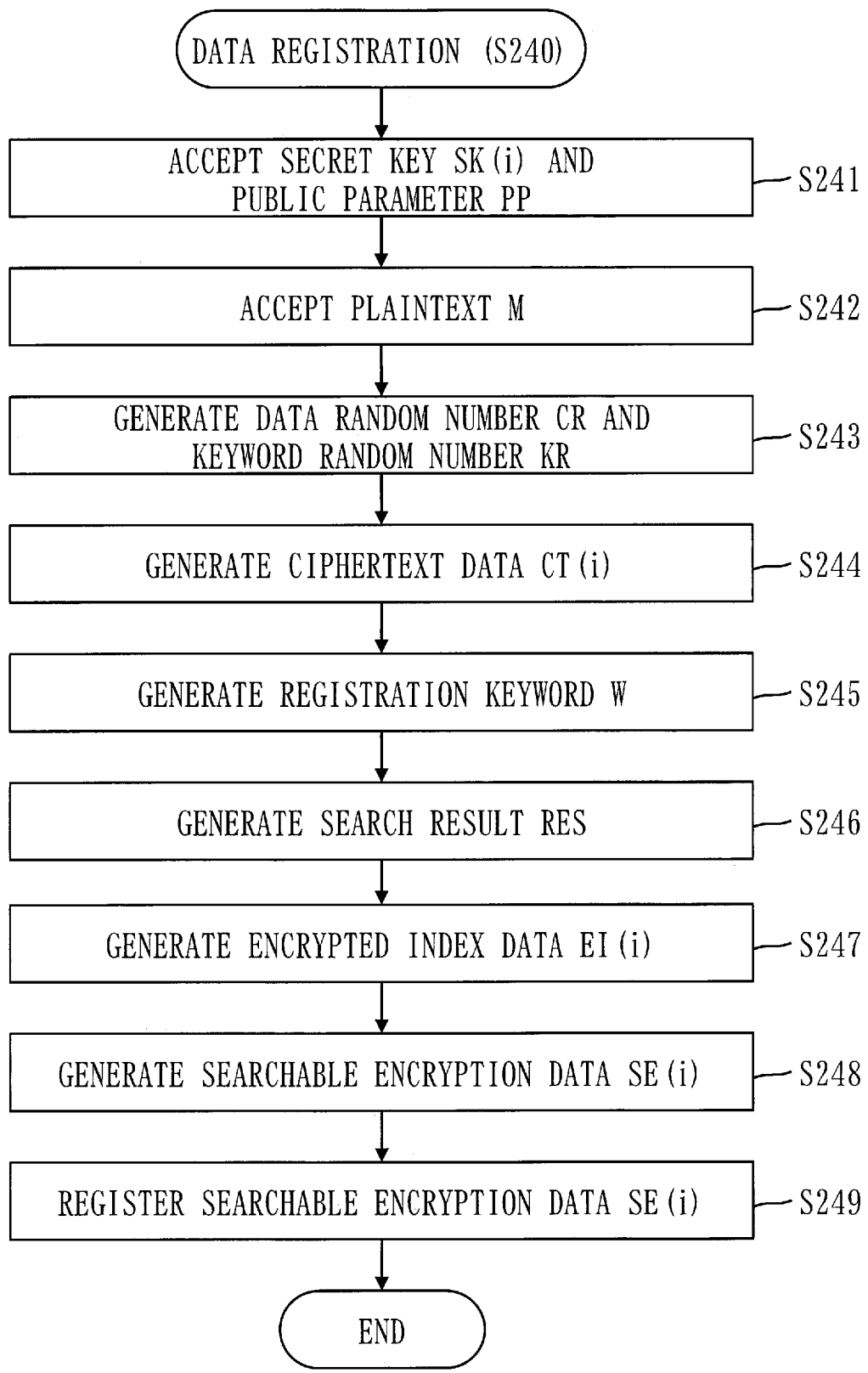
FIG. 19 is a flowchart of data registration (S240) in Embodiment 2.

Based on FIG. 19, a procedure for data registration (S240) will be described.

The data registration (S240) corresponds to the data registration (S140) in Embodiment 1.

In step S241, the acceptance unit 410 accepts the secret key SK(i) and the public parameter PP.

Step S241 is the same as step S141 in Embodiment 1.

In step S242, the acceptance unit 410 accepts a plaintext M.

Step S242 is the same as step S142 in Embodiment 1.

In step S243, the random number generating unit 421 generates a data random number CR and a keyword random number KR.

Step S243 is the same as step S143 in Embodiment 1.

In step S244, the ciphertext data generating unit 422 encrypts the plaintext M, using the secret key SK(i), the public parameter PP, and the data random number CR. As a result, ciphertext data CT(i) is generated.

Step S244 is the same as step S144 in Embodiment 1.

In step S245, the keyword generating unit 423 generates a registration keyword W.

Step S245 is the same as step S145 in Embodiment 1.

It is assumed that at least one plaintext M is accepted in step S242, at least one piece of ciphertext data CT(i) is generated in step S244, and at least one registration keyword W is generated in step S245.

In step S246, the search result generating unit 425 generates a search result RES based on at least one registration keyword W.

Specifically, the search result generating unit 425 generates, for each registration keyword W, data including at least one file name File(M) corresponding to the registration keyword W. The generated data is the search result RES.

The search result RES is expressed as indicated below.

$$RES=\{(kw,res)\}$$

"kw" is a keyword, and is equivalent to the registration keyword W.

"res" is an identifier, and is equivalent to the file name File(M).

Figure 20:
FIG. 20 is a figure illustrating an example of a search result RES in Embodiment 2.

As illustrated in FIG. 20, the search result RES has an inverted index structure. That is, it has a structure that allows reverse lookup for a matching identifier from a keyword.

FIG. 20 illustrates an example of the search result RES.

In FIG. 20, the search result RES associates a keyword with at least one file name on a per keyword basis.

Referring back to FIG. 19, the description will be continued from step S247.

In step S247, the encrypted index generating unit 426 encrypts the search result RES, using the secret key SK(i), the public parameter PP, and the keyword random number KR. As a result, encrypted index data EI(i) is generated.

The encrypted index data EI(i) includes an encrypted index EI and the key generation number i.

The encrypted index EI is the search result RES that has been encrypted, and includes an encrypted keyword key and an encrypted identifier val.

The encrypted keyword key is the keyword kw that has been encrypted. The keyword kw is encrypted using the keyword key KK(i).

The encrypted identifier val is the identifier res that has been encrypted. The identifier res is encrypted using the encrypted keyword kw and the keyword random number KR.

For example, the encrypted index data EI(i) is expressed as indicated below.

$$EI=\{(key,val)\}$$

$$key=F(KK(i)\|0\|kw)$$

$$val=E(F(KK(i)\|1\|kw),res,KR)$$

In step S248, the registration unit 430 generates searchable encryption data SE(i).

The searchable encryption data SE(i) includes the file name File(M), the ciphertext data CT, the encrypted index data EI(i), and the key generation number i.

That is, the searchable encryption data SE(i) is a set of the file name File(M), the ciphertext data CT, the encrypted index data EI(i), and the key generation number i.

The searchable encryption data SE(i) is expressed as indicated below.

$$SE(i)=(File(M),CT(i),EI(i),i)$$

As described above, the searchable encryption data EI(i) includes the encrypted index data EI(i) in place of the encrypted tag data ET(i) of Embodiment 1.

In step S249, the registration unit 430 registers the searchable encryption data SE(i) in the registration database 691.

Step S249 is the same as step S148 in Embodiment 1.

Figure 21:
FIG. 21 is a figure illustrating an example of the registration database 691 in Embodiment 2.

FIG. 21 illustrates an example of the registration database 691.

In FIG. 21, data in one row is equivalent to one piece of the searchable encryption data SE(i).

In the data in one row, the file name File(M), the ciphertext data CT(i), the encrypted index data ET(i), and the key generation number i are associated with one another.

Figure 22:
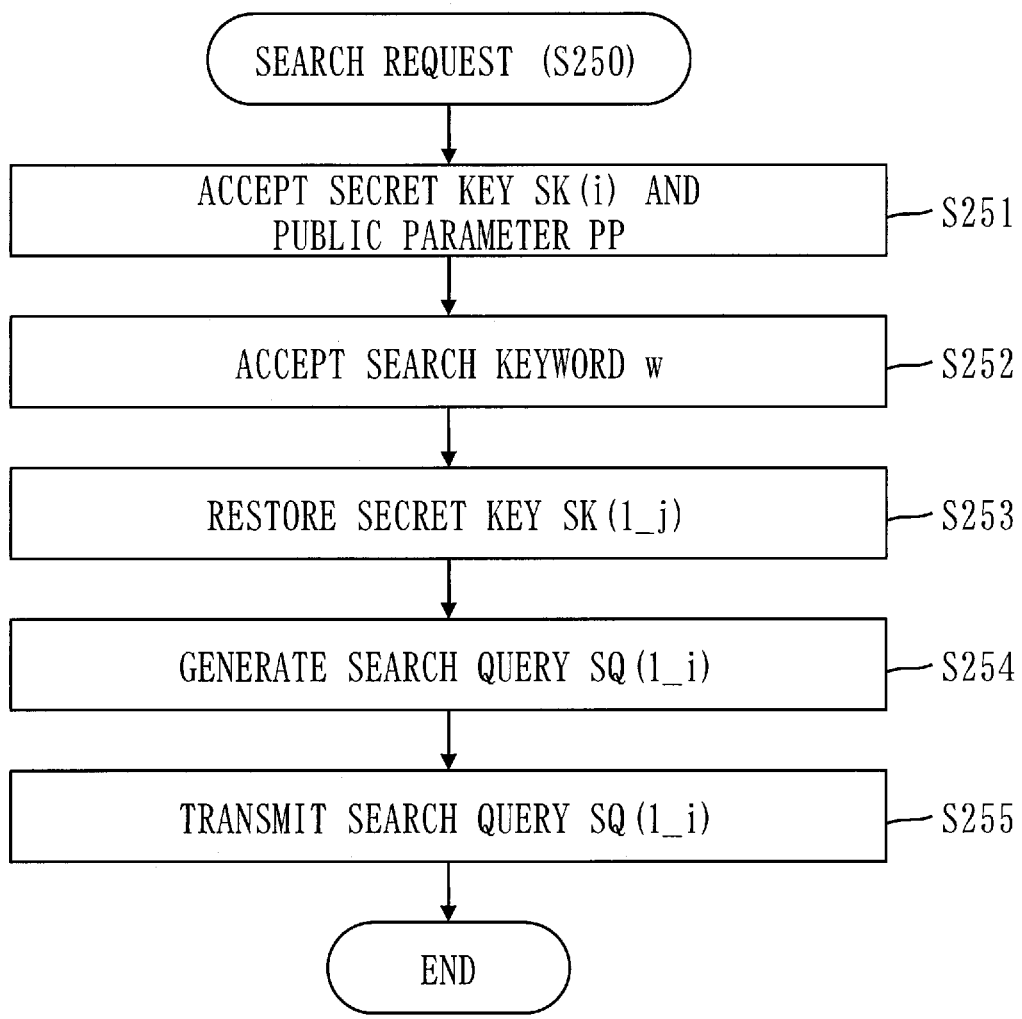
FIG. 22 is a flowchart of search request (S250) in Embodiment 2.

Based on FIG. 22, a procedure for search request (S250) will be described.

The search request (S250) is equivalent to the search request (S150) in Embodiment 1.

In step S251, the acceptance unit 510 accepts the secret key SK(i) and the public parameter PP.

Step S251 is the same as step S151 in Embodiment 1.

In step S252, the acceptance unit 510 accepts a search keyword w.

Step S252 is the same as step S252 in Embodiment 1.

In step S253, the restoration unit 520 restores the secret key SK(1_j), using the secret key SK(i) and the public parameter PP.

Step S253 is the same as step S153 in Embodiment 1.

In step S254, the generating unit 530 generates a search query SQ(1_i), using the secret key SK(1_i), the public parameter PP, and the search keyword w.

The search query SQ(1_i) includes the search query SQ of each generation of the first generation to the i-th generation.

The search query SQ(n) includes a first query SQ(n)1 and a second query SQ(n)2.

Each of the first query SQ(n)1 and the second query SQ(n)2 is the search keyword w that has been encrypted using the secret key SK of the n-th generation.

For example, the search query SQ(n) is expressed as indicated below.

$$SQ(n)=(SQ(n)1,SQ(n)2)$$

$$SQ(n)1=F(KK(n)\|w\|0)$$

$$SQ(n)2=F(KK(n)\|w\|1)$$

In step S255, the request unit 540 transmits the search query SQ(1_i) to the data management device 600, using the communication device 505.

Figure 23:
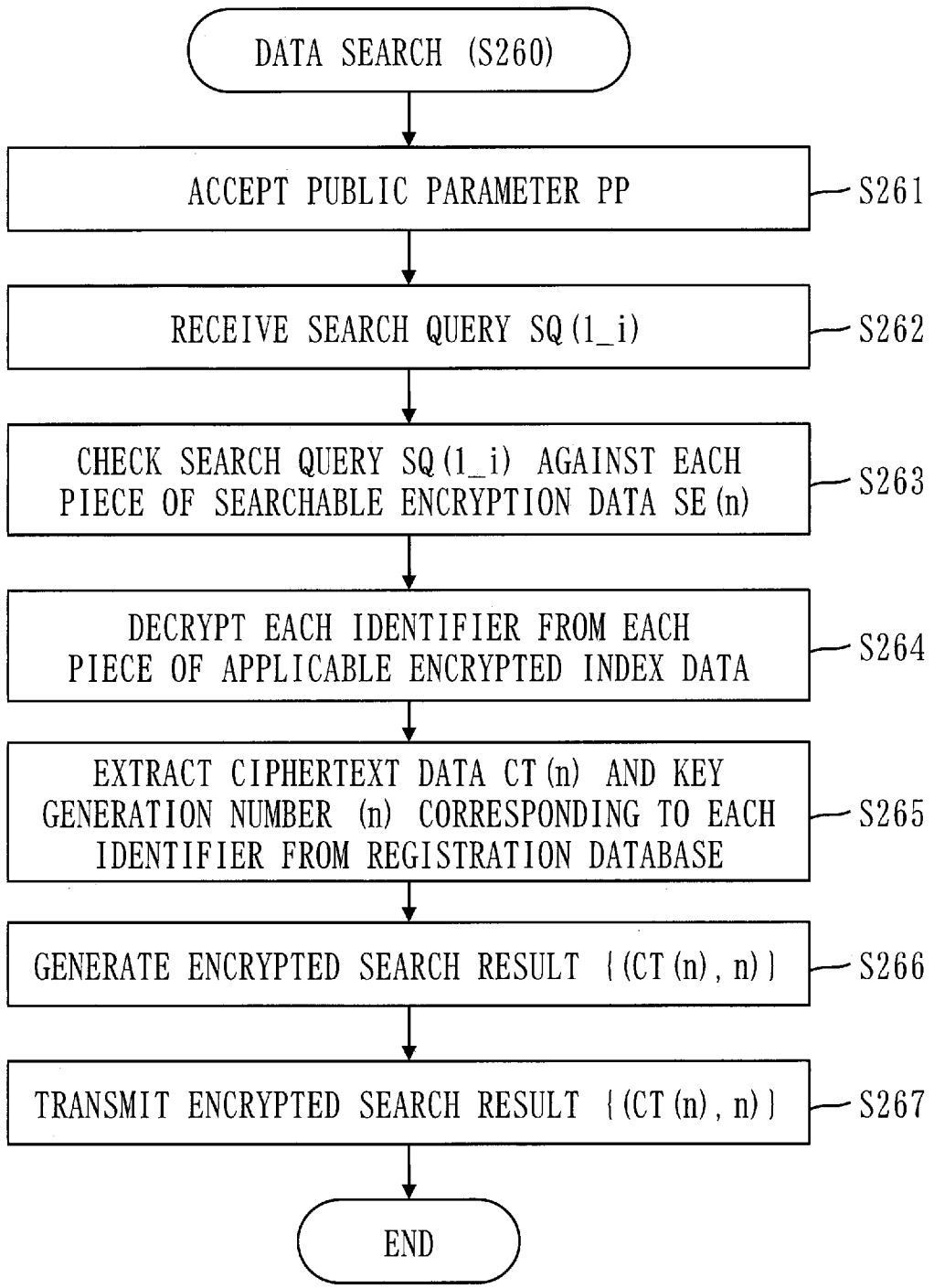
FIG. 23 is a flowchart of data search (S260) in Embodiment 2.

Based on FIG. 23, a procedure for data search (S260) will be described.

The data search (S260) is equivalent to the data search (S160) in Embodiment 1.

In step S261, the acceptance unit 610 accepts the public parameter PP.

Step S261 is the same as step S161 in Embodiment 1.

In step S262, the acceptance unit 610 receives the search query SQ(1_i).

Step S262 is the same as step S162 in Embodiment 1.

In step S263, the checking unit 621 checks the search query SQ(1_i) against each piece of searchable encryption data SE(n) in the registration database 691 to find searchable encryption data SE(n) that matches the search query SQ(1_i).

The checking unit 621 checks the search query SQ(1_i) against the searchable encryption data SE(n) as described below.

First, the checking unit 621 determines whether the key generation number n included in the searchable encryption data SE(n) is equal to or smaller than i.

If the key generation number n is equal to or smaller than i, the checking unit 621 extracts the encrypted index EI from the encrypted index data EI(n) in the searchable encryption data SE(n).

Then, the checking unit 621 compares the first query SQ(k)1 with each encrypted keyword key in the encrypted index EI, for each search query SQ(k) included in the search query SQ(1_i).

If the encrypted keyword key that matches the first query SQ(k)1 is found, the searchable encryption data SE(n) matches the search query SQ(1_i).

The searchable encryption data SE(n) that matches the search query SQ(1_i) is referred to the "applicable searchable encryption data SE(n)". The applicable searchable encryption data SE(n) includes the encrypted index data EI(n) that matches the search query SQ(1_i).

The encrypted keyword key that matches the first query SQ(k)1 is referred to as an "applicable encrypted keyword key". The encrypted index data EI(n) including the applicable encrypted keyword key is referred to as "applicable encrypted index data EI(n)".

The second query SQ(k)2 corresponding to the first query SQ(k)1 is referred to as an "applicable second query SQ(k)2".

In step S264, the extraction unit 622 extracts at least one encrypted identifier val corresponding to the applicable encrypted keyword key from each piece of the applicable encrypted index data EI(n).

Then, the extraction unit 622 decrypts the identifier res from the encrypted identifier val using the applicable second query SQ(k)2, for each extracted encrypted identifier val. The identifier res is decrypted as indicated below.

$$res=D(SQ(k)2,val)$$

In step S265, the extraction unit 622 extracts, for each decrypted identifier res, a set of the ciphertext data CT and the key generation number n associated with the same file name File(M) as the identifier res from the registration database 691.

In step S266, the output unit 630 generates data including a set that includes each set of the ciphertext data CT(n) and the key generation number n. The generated data is the encrypted search result {(CT(n), n)}.

Step S266 is the same as step S165 in Embodiment 1.

In step S267, the output unit 630 transmits the encrypted search result {(CT(n), n)} to the search operation device 500, using the communication device 605.

Step S267 is the same as step S166 in Embodiment 1.

Effects of Embodiment 2

Embodiment 2 allows a key update to be performed also in the scheme using the encrypted index EI in searchable encryption of the common-key scheme. In addition, the old secret key SK(1_j) can be restored from the new secret key SK(i), and the search query SQ(1_i) can be generated using the entire secret key SK(1_i).

Embodiment 2 has the following effect in addition to substantially the same effects as those of Embodiment 1.

Identifiers that are found as hits for a search keyword can be extracted collectively without decrypting cyphertexts.

Embodiment 3

With regard to an embodiment in which a search query SQ(1_j) is restored from the search query SQ(i), differences from Embodiment 1 will be mainly described based on FIGS. 24 to 30. "j" is an integer equal to or smaller than (i−1).

The search query SQ(1_j) is expressed as indicated below.

$$SQ(1\_j)=(SK(1), \ldots, SK(i-1))$$

*Description of Configurations*

The configuration of the searchable encryption system 100 is the same as the configuration in Embodiment 1 (see FIG. 1).

However, part of the configuration of the data management device 600 is different from the configuration in Embodiment 1.

Figure 24:
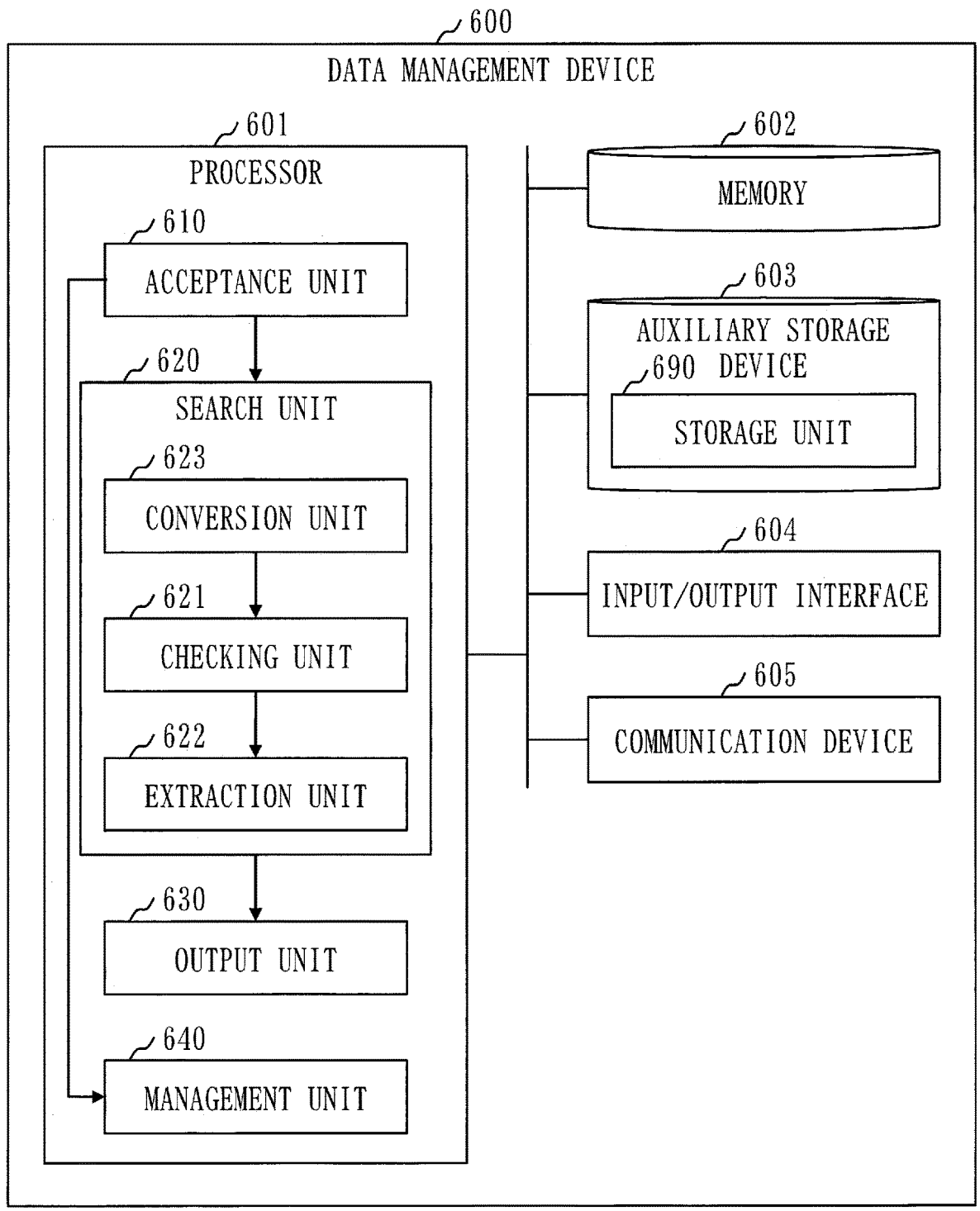
FIG. 24 is a configuration diagram of the data management device 600 in Embodiment 3.

Based on FIG. 24, the configuration of the data management device 600 will be described.

The data management device 600 includes an element called a conversion unit 623.

*Description of Operation*

Figure 25:
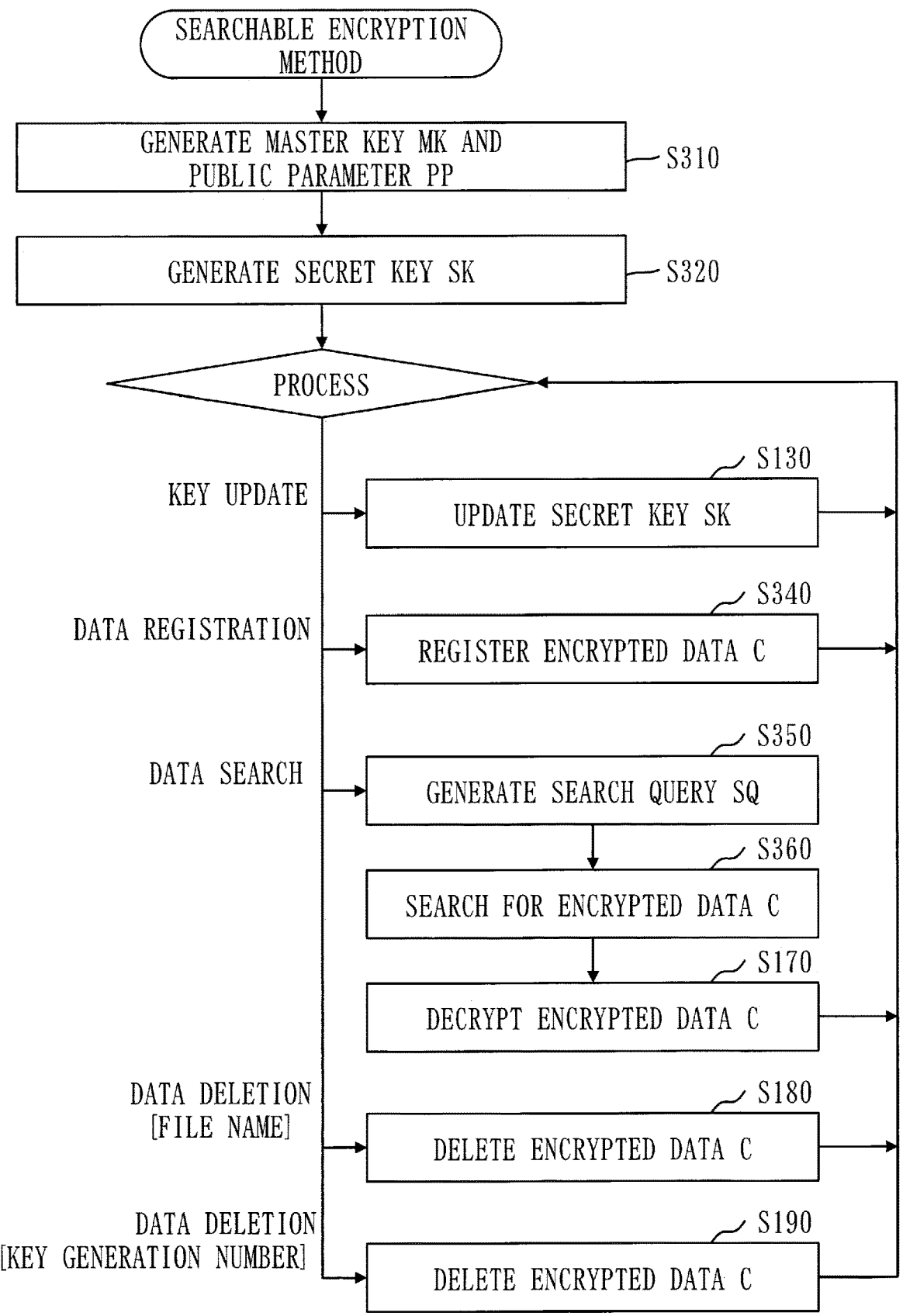
FIG. 25 is a flowchart of the searchable encryption method in Embodiment 3.

Based on FIG. 25, the searchable encryption method will be described.

Steps S130, S170, S180 and S190 are as described in Embodiment 1.

Steps S310, S320, S340, S350, and S360 will be described below.

Figure 26:
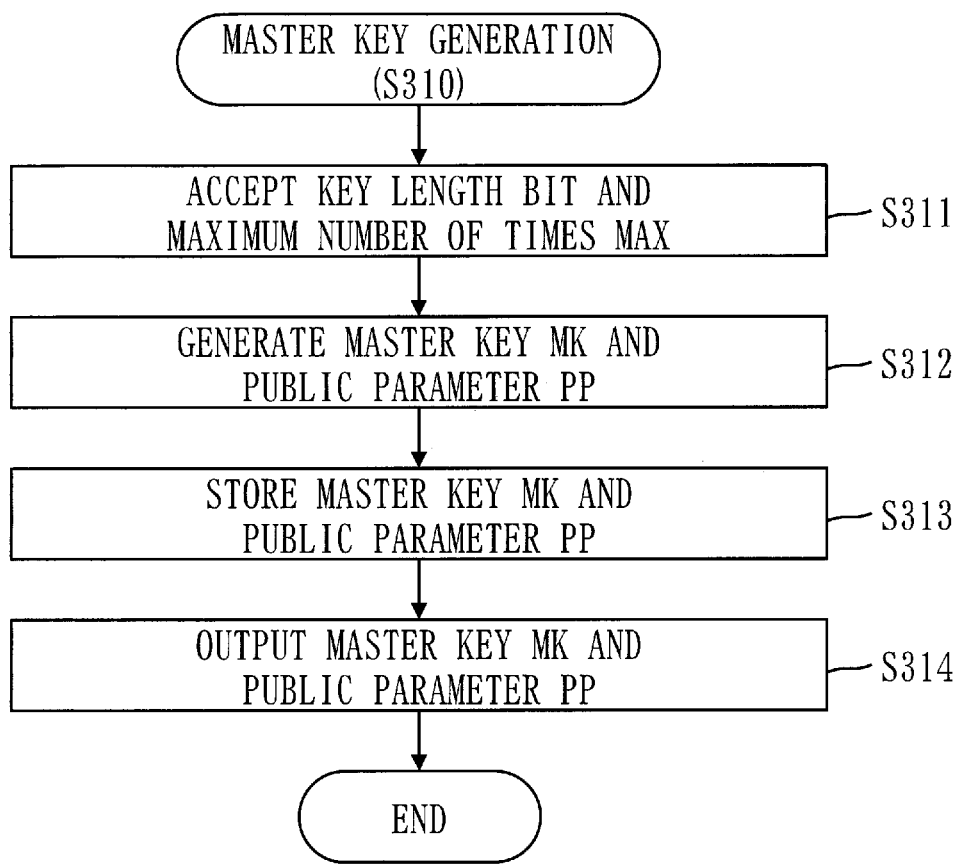
FIG. 26 is a flowchart of master key generation (S310) in Embodiment 3.

Based on FIG. 26, a procedure for master key generation (S310) will be described.

The master key generation (S310) corresponds to the master key generation (S110) in Embodiment 1.

In step S311, the acceptance unit 210 accepts the key length BIT and the maximum number of times MAX.

In step S312, the generating unit 220 generates a master key MK and a public parameter PP based on the key length BIT.

The master key MK and the public parameter PP are generated as described below.

First, the generating unit 220 randomly selects two prime numbers (P, Q) with the same bit length as BIT/2.

Next, the generating unit 220 calculates a product N(=P*Q) of the prime number P and the prime number Q.

Next, the generating unit 220 randomly selects an integer x from a set $\{1, 2, \ldots, N-1\}$ of integers from 1 and (N−1).

Next, the generating unit 220 divides the square root of the integer x by the product N to calculate a remainder g (=x*x mod N). "X mod Y" means a remainder when X is divided by Y.

A product obtained by calculating (P−1)*(Q−1) is denoted as "Z".

Next, the generating unit 220 randomly selects an integer y that is mutually sparse with Z from a set $\{1, 2, \ldots, Z\}$ of integers from 1 to Z.

Next, the generating unit 220 divides the square root of the integer y by the product Z to calculate a remainder e (=y*y mod Z).

Next, the generating unit 220 selects an integer d that satisfies d*e mod Z=1 from the set of integers from 1 to Z.

Then, the generating unit 220 generates the master key MK and the public parameter PP.

The master key MK includes the prime number P, the prime number Q, the remainder g, and the integer d.

The public parameter PP includes the product N, the remainder e, the identifier of the cryptographic function F, and the maximum number of times MAX.

The master key MK is expressed as indicated below.

$MK=(P,Q,g,d)$

The public parameter PP is expressed as indicated below.

$PP=(N,e,E,F,MAX)$

In step S313, the generating unit 220 stores and keeps the master key MK and the public parameter PP in the storage unit 290.

Step S313 is the same as step S113 in Embodiment 1.

In step S314, the output unit 230 outputs the master key MK and the public parameter PP.

Step S314 is the same as step S114 in Embodiment 1.

Figure 27:
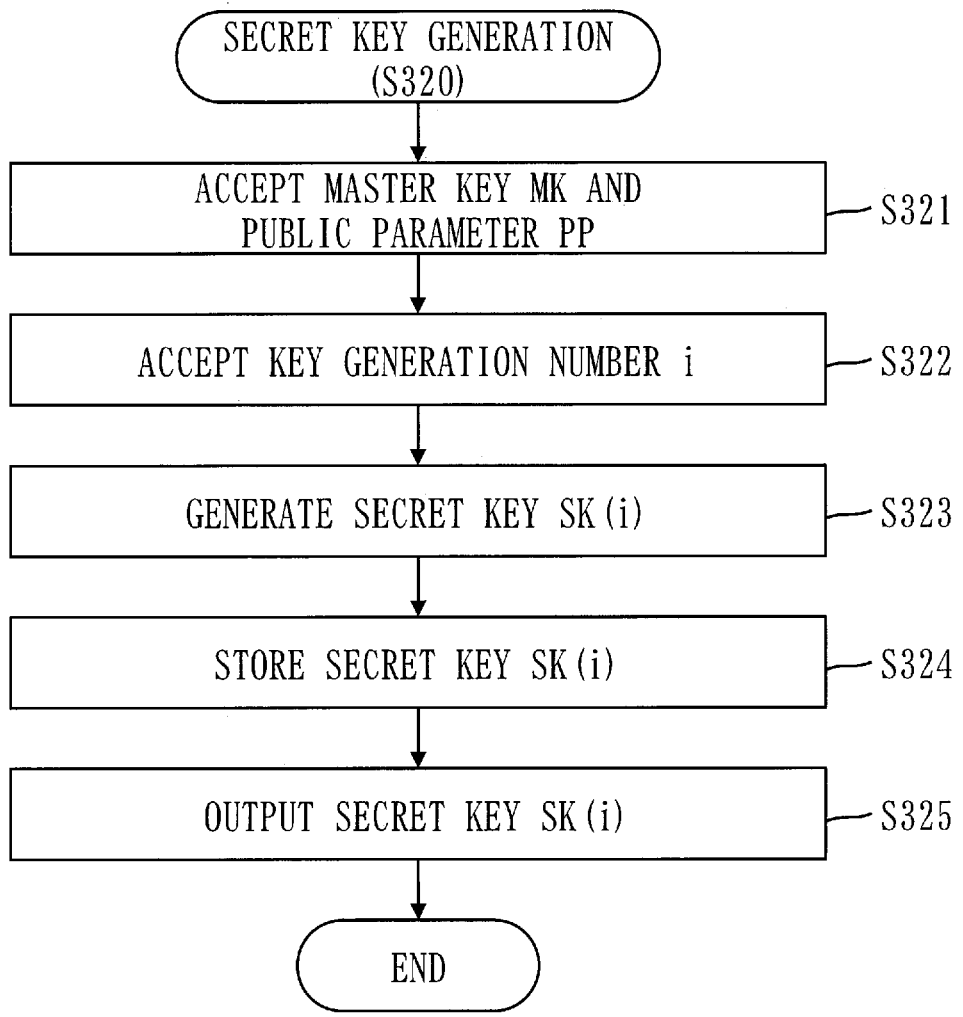
FIG. 27 is a flowchart of secret key generation (S320) in Embodiment 3.

Based on FIG. 27, a procedure for secret key generation (S320) will be described.

The secret key generation (S320) is equivalent to the secret key generation (S120) in Embodiment 1.

In step S321, the acceptance unit 310 accepts the master key MK and the public parameter PP.

Step S321 is the same as step S121 in Embodiment 1.

In step S322, the acceptance unit 310 accepts the key generation number i.

Step S322 is the same as step S122 in Embodiment 1.

In step S323, the generating unit 320 generates a secret key SK(i), using the master key MK, the public parameter PP, and the key generation number i.

The secret key SK(i) includes the data key DK(i), the keyword key KK(i), and the key generation number i.

The secret key SK(i) is expressed as indicated below.

$SK(i)=(DK(i),KK(i),i)$

The data key DK(i) and the keyword key KK(i) are expressed as indicated below. That is, the data key DK(i) and the keyword key KK(i) are generated by multiple encryption.

$DK(i)=F(g^{ei} \bmod N)$ $KK(i)=g^{ei} \bmod N$ $ei=e^{(MAX-i+1)} \bmod ((P-1)*(Q-1))$ However, since F(KK(i))=DK(i) holds, the secret key SK(i) may be without the data key DK(i).

The keyword key KK has the following relationship.

$KK(i-1)=KK(i)^e \bmod N$

Due to the above relationship, if the keyword key KK(i) and the remainder e are known, the keyword key KK(i−1) can be restored. Furthermore, by repeating restoration, not only the keyword key KK(i−1) but also KK(i−2), KK(1) can be restored from the keyword key KK(i) and the remainder e.

Similarly, DK(i−1), DK(1) can also be restored from the data key DK(i) and the remainder e.

If the secret key SK(i−1) is kept, the generating unit 320 may generate the secret key SK(i), using the secret key SK(i−1).

In that case, the data key DK(i) and the keyword key KK(i) are expressed as indicated below.

$DK(i)=F(KK(i-1)^d \bmod N)$ $KK(i)=KK(i-1)^d \bmod N$

In step S324, the generating unit 320 stores and keeps the secret key SK(i) in the storage unit 390.

Step S324 is the same as step S124 in Embodiment 1.

In step S325, the output unit 330 outputs the secret key SK(i).

Step S325 is the same as step S125 in Embodiment 1.

Figure 28:
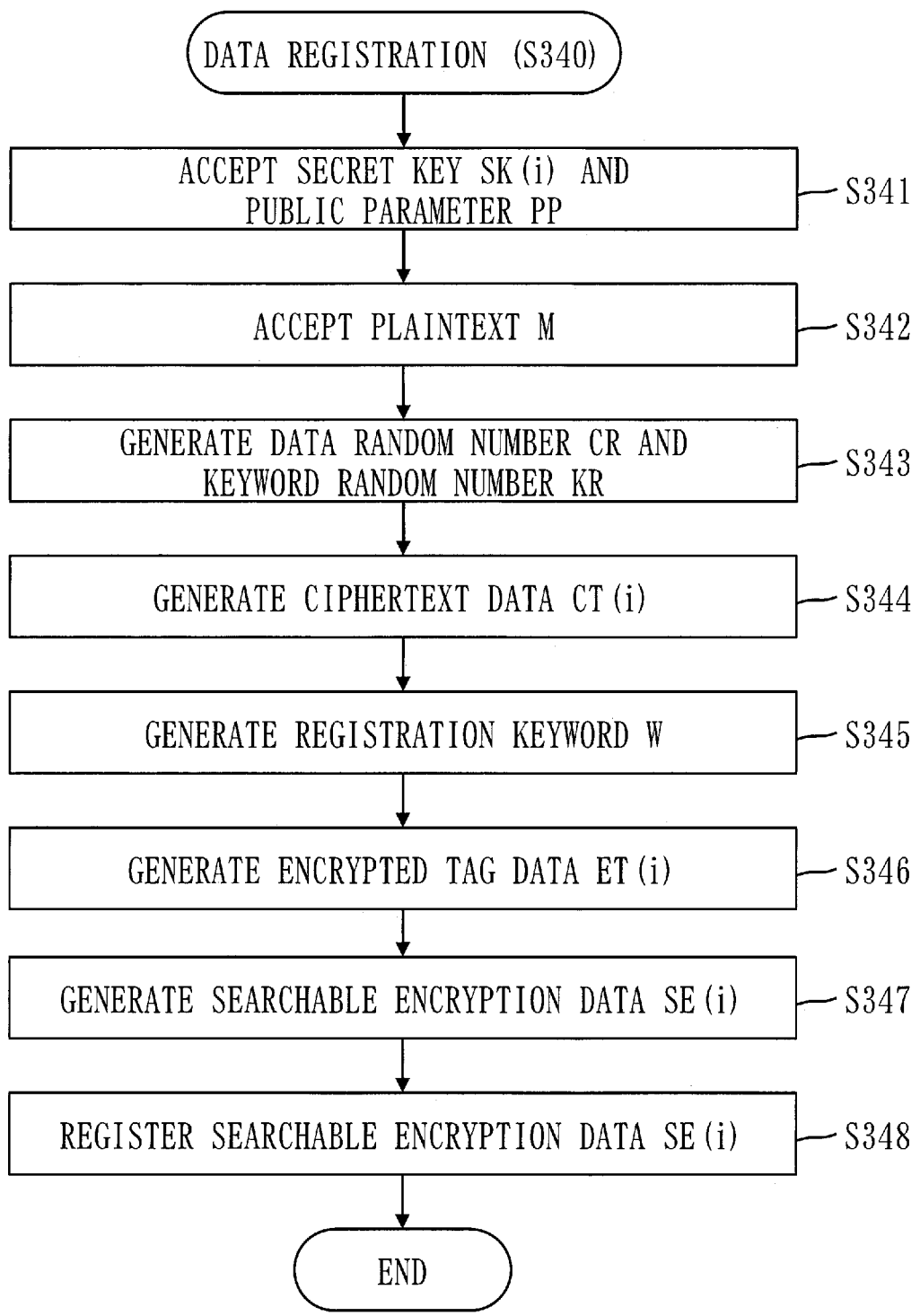
FIG. 28 is a flowchart of data registration (S340) in Embodiment 3.

Based on FIG. 28, a procedure for data registration (S340) will be described. The data registration (S340) is equivalent to step S140 in Embodiment 1.

In step S341, the acceptance unit 410 accepts the secret key SK(i) and the public parameter PP.

Step S341 is the same as S141 in Embodiment 1.

In step S342, the acceptance unit 410 accepts a plaintext M.

Step S342 is the same as step S142 in Embodiment 1.

In step S343, the random number generating unit 421 generates a data random number CR and a keyword random number KR.

Step S343 is the same as step S143 in Embodiment 1.

In step S344, the ciphertext data generating unit 422 encrypts the plaintext M, using the secret key SK(i), the public parameter PP, and the data random number CR. As a result, ciphertext data CT(i) is generated.

Step S344 is the same as step S144 in Embodiment 1.

In step S345, the keyword generating unit 423 generates a registration keyword W.

Step S345 is the same as step S145 in Embodiment 1.

In step S346, the encrypted tag generating unit 424 encrypts the registration keyword W, using the secret key SK(i), the public parameter PP, and the keyword random number KR, so as to generate encrypted tag data ET(i).

The encrypted tag data ET(i) includes the encrypted tag ET and the key generation number i.

The encrypted tag ET includes the encrypted keyword EW and the keyword random number KR.

The encrypted tag data ET(i) is expressed as indicated below.

$$ET(i)=(ET,i)$$

$$ET=(EW,KR)$$

For example, the encrypted keyword EW is expressed as indicated below. In this case, the encrypted tag generating unit 424 encrypts the registration keyword W, using the keyword key KK(i) and the keyword random number KR. As a result, the encrypted keyword EW is generated.

$$EW=F(KR\|KK(i)^{F(W)} \bmod N)$$

If there are a plurality of registration keywords W, the encrypted tag ET includes the encrypted tag of each registration keyword W.

For example, if there are a registration keyword W1 and a registration keyword W2, the encrypted tag ET is expressed as indicated below.

$$ET=(F(KR\|KK(i)^{F(W1)} \bmod N), F(KR\|KK(i)^{F(W2)} \bmod N), KR)$$

In step S347, the registration unit 430 generates searchable encryption data SE(i).

The searchable encryption data SE(i) includes the file name File(M), the ciphertext data CT(i), the encrypted tag data ET(i), and the key generation number i.

Step S347 is the same as step S147 in Embodiment 1.

In step S348, the registration unit 430 registers the searchable encryption data SE(i) in the registration database 691.

Step S348 is the same as step S148 in Embodiment 1.

Figure 29:
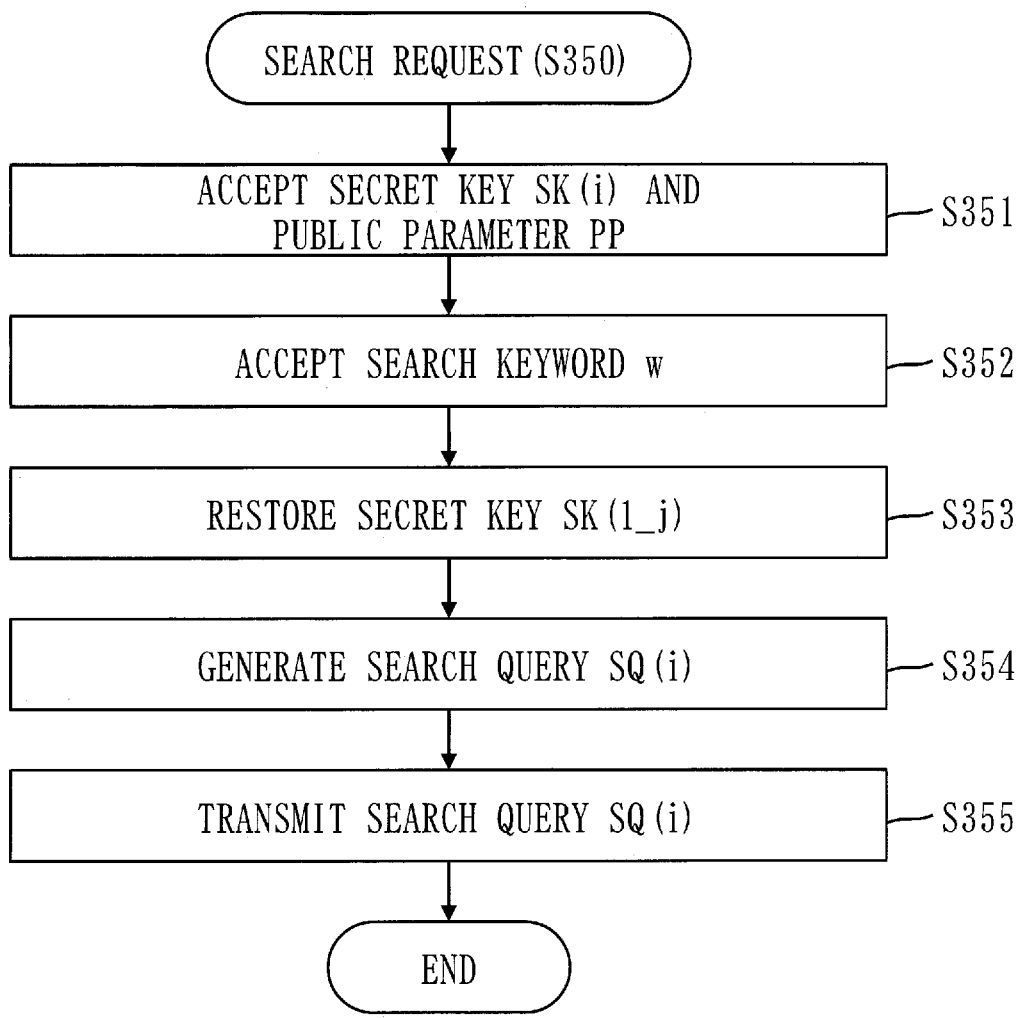
FIG. 29 is a flowchart of search request (S350) in Embodiment 3.

Based on FIG. 29, a procedure for search request (S350) will be described.

The search request (S350) is equivalent to the search request (S150) in Embodiment 1.

In step S351, the acceptance unit 510 accepts the secret key SK(i) and the public parameter PP.

Step S351 is the same as step S151 in Embodiment 1.

In step S352, the acceptance unit 510 accepts the search keyword w.

Step S352 is the same as step S152 in Embodiment 1.

In step S353, the restoration unit 520 restores the secret key SK(1_j), using the secret key SK(i) and the public parameter PP.

The secret key SK(1_j) is expressed as indicated below.

$$SK(1\_j)=(SK(1),\ldots,SK(i-2),SK(i-1))$$

The secret key SK(1_j) is restored as described below.

First, the restoration unit 520 restores the data key DK(1_j).

The data key DK(1_j) is expressed as indicated below. It is assumed that $KK(i)=g^{ei} \bmod N$ holds.

$$DK(1\_j)=(DK(1),\ldots,DK(i-2),DK(i-1))$$

$$DK(i-1)=F(KK(i)^e \bmod N)$$

$$DK(i-2)=F(KK(i)^{e*e} \bmod N)$$

$$DK(1)=F(KK(i)^{e*\cdots*e} \bmod N)$$

DK(i−3) to DK(2) are calculated similarly to DK(i−2).

The restoration unit 520 also restores the keyword key KK(1_j).

The keyword key KK(1_j) is restored similarly to the data key DK(1_j).

Then, the restoration unit 520 generates the secret key SK of each generation of the first generation to the (i−1)-th generation.

The secret key SK(n) is expressed as indicated below. The secret key SK(n) is the secret key SK of the n-th generation.

$$SK(n)=(DK(n),KK(n),n)$$

In step S354, the generating unit 530 generates a search query SQ(i), using the secret key SK(i), the public parameter PP, and the search keyword w.

For example, the search query SQ(i) is expressed as indicated below.

$$SQ(i)=KK(i)^{F(w)} \bmod N$$

In step S355, the request unit 540 transmits the search query SQ(i) to the data management device 600, using the communication device 505.

Figure 30:
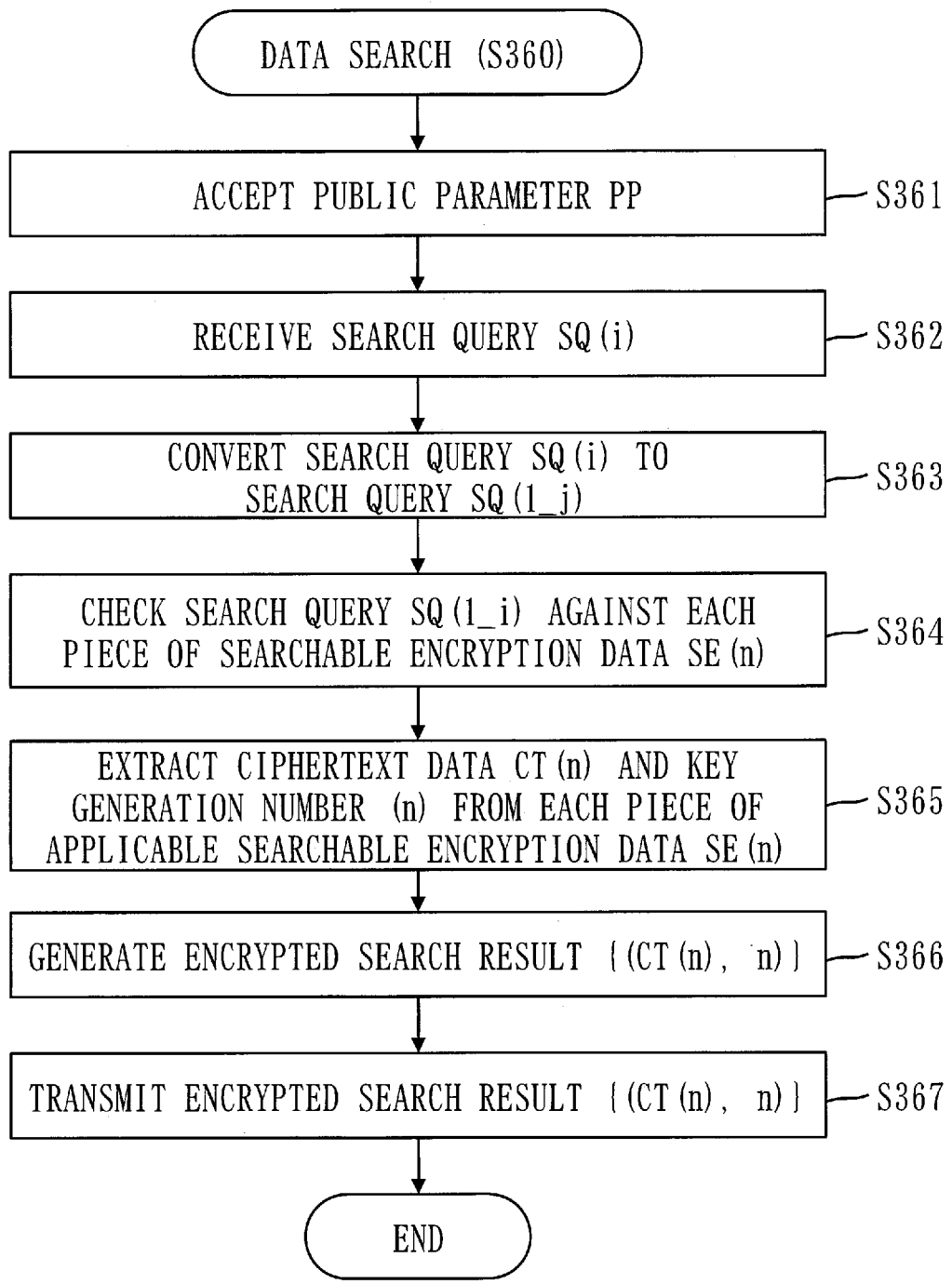
FIG. 30 is a flowchart of data search (S360) in Embodiment 3.

Based on FIG. 30, a procedure for data search (S360) will be described.

The data search (S360) is equivalent to the data search (S160) in Embodiment 1.

In step S361, the acceptance unit 610 accepts the public parameter PP.

Step S361 is the same as step S161 in Embodiment 1.

In step S362, the acceptance unit 610 receives the search query SQ(1_i).

Step S362 is the same as step S162 in Embodiment 1.

In step S363, the conversion unit 623 converts the search query SQ(i) to a search query (1_j).

The search query SQ(1_j) is expressed as indicated below. It is assumed that $SQ(i)=KK(i)F(w) \bmod N$ holds.

$$SQ(1\_j)=(SQ(1),\ldots,SQ(i-2),SQ(i-1))$$

$$SQ(i-1)=SQ(i)^e \bmod N$$

$$SQ(i-2)=SQ(i-1)^e \bmod N$$

$$SQ(1)=SQ(2)^e \bmod N$$

SQ(i−3) to SQ(2) are calculated similarly to SQ(i−2).

In step S364, the checking unit 621 checks the search query SQ(1_i) against each piece of searchable encryption data SE(n) in the registration database 691 so as to find searchable encryption data SE(n) that matches the search query SQ(1_i).

The checking unit 621 checks the search query SQ(1_i) against the searchable encryption data SE(n) as described below.

First, the checking unit 621 determines whether the key generation number n included in the searchable encryption data SE(n) is equal to or smaller than i.

If the key generation number n is equal to or smaller than i, the checking unit 621 extracts the encrypted tag ET from the encrypted tag data ET(n) in the searchable encryption data SE(n), and extracts the encrypted keyword EW and the keyword random number KR from the extracted encrypted tag ET.

Next, the checking unit 621 generates a checking tag Tg(k) for each search query SQ(k) included in the search query SQ(1_i), using the search query SQ(k) and the extracted keyword random number KR.

The checking tag Tg(k) is expressed as indicated below.

$$Tg(k)=F(KR\|SQ(k))$$

Then, the checking unit 621 compares the checking tag Tg(k) with the extracted encrypted keyword EW, for each search query SQ(k) included in the search query SQ(1_i).

If one of the checking tags Tg(k) matches the extracted encrypted keyword EW, the searchable encryption data SE(n) matches the search query SQ(1_i).

In a case where there are a plurality of encrypted keywords EW, if one of the checking tags Tg(k) matches one of the encrypted keywords EW, the searchable encryption data SE(n) matches the search query SQ(1_i).

The searchable encryption data SE(n) that matches the search query SQ(1_i) is referred to as the "applicable searchable encryption data SE(n)". The applicable searchable encryption data SE(n) includes the encrypted tag data ET(n) that matches the search query SQ(1_i).

In step S365, the extraction unit 622 extracts the ciphertext data CT(n) and the key generation number n from each piece of the applicable searchable encryption data SE(n).

Step S365 is the same as step S164 in Embodiment 1.

In step S366, the output unit 630 generates data including a set that includes each set of the ciphertext data CT(n) and the key generation number n. The generated data is the encrypted search result {(CT(n), n)}.

Step S366 is the same as step S165 in Embodiment 1.

In step S367, the output unit 630 transmits the encrypted search result {(CT(n), n)} to the search operation device 500, using the communication device 605.

Step S367 is the same as step S166 in Embodiment 1.

Effects of Embodiment 3

Embodiment 3 allows a key update to be performed using an encrypted tag in searchable encryption of the common-key scheme. In addition, the old search query (1_j) can be restored from the new search query (i).

Embodiment 3 has the following effect in addition to substantially the same effects as those of Embodiment 1.

By using the public parameter PP, the search query SQ(i) generated based on the new secret key SK(i) can be converted to the search query(1_j) generated based on the old secret key SK(1_j). That is, the search query size can be reduced.

Embodiment 4

With regard to an embodiment in which the encrypted index EI is used in place of the encrypted tag ET and the search query SQ(1_j) is restored from the search query SQ(i), differences from Embodiments 1 to 3 will be mainly described based on FIGS. 31 to 35.

*Description of Configurations*

The configuration of the searchable encryption system 100 is the same as the configuration in Embodiment 1 (see FIG. 1).

However, part of the configuration of each of the registration device 400 and the data management device 600 is different from the configuration in Embodiment 1.

Figure 31:
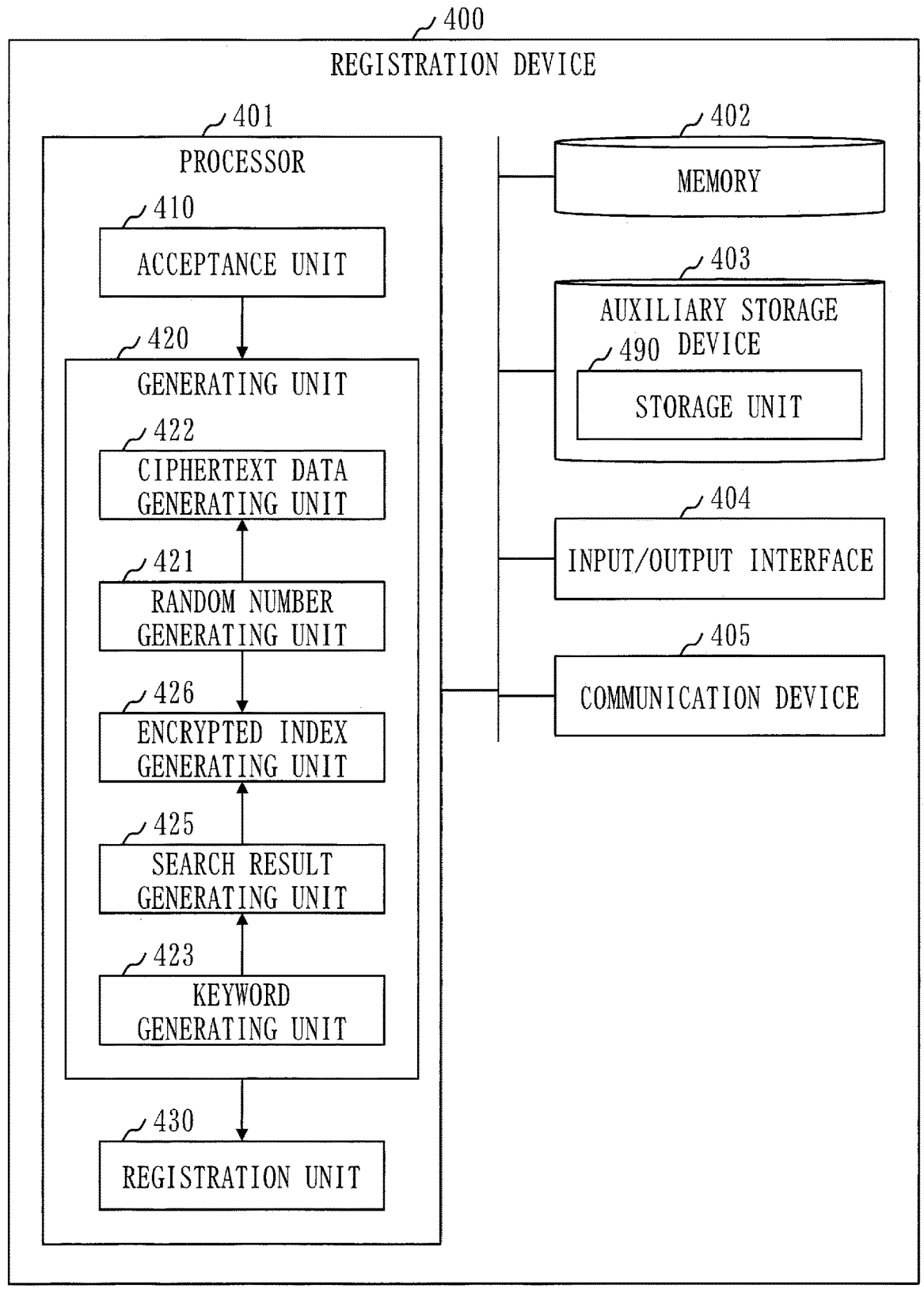
FIG. 31 is a configuration diagram of the registration device 400 in Embodiment 4.

Based on FIG. 31, the configuration of the registration device 400 will be described.

The registration device 400 includes elements such as the search result generating unit 425 and the encrypted index generating unit 426 in place of the encrypted tag generating unit 424 in Embodiment 1.

Figure 32:
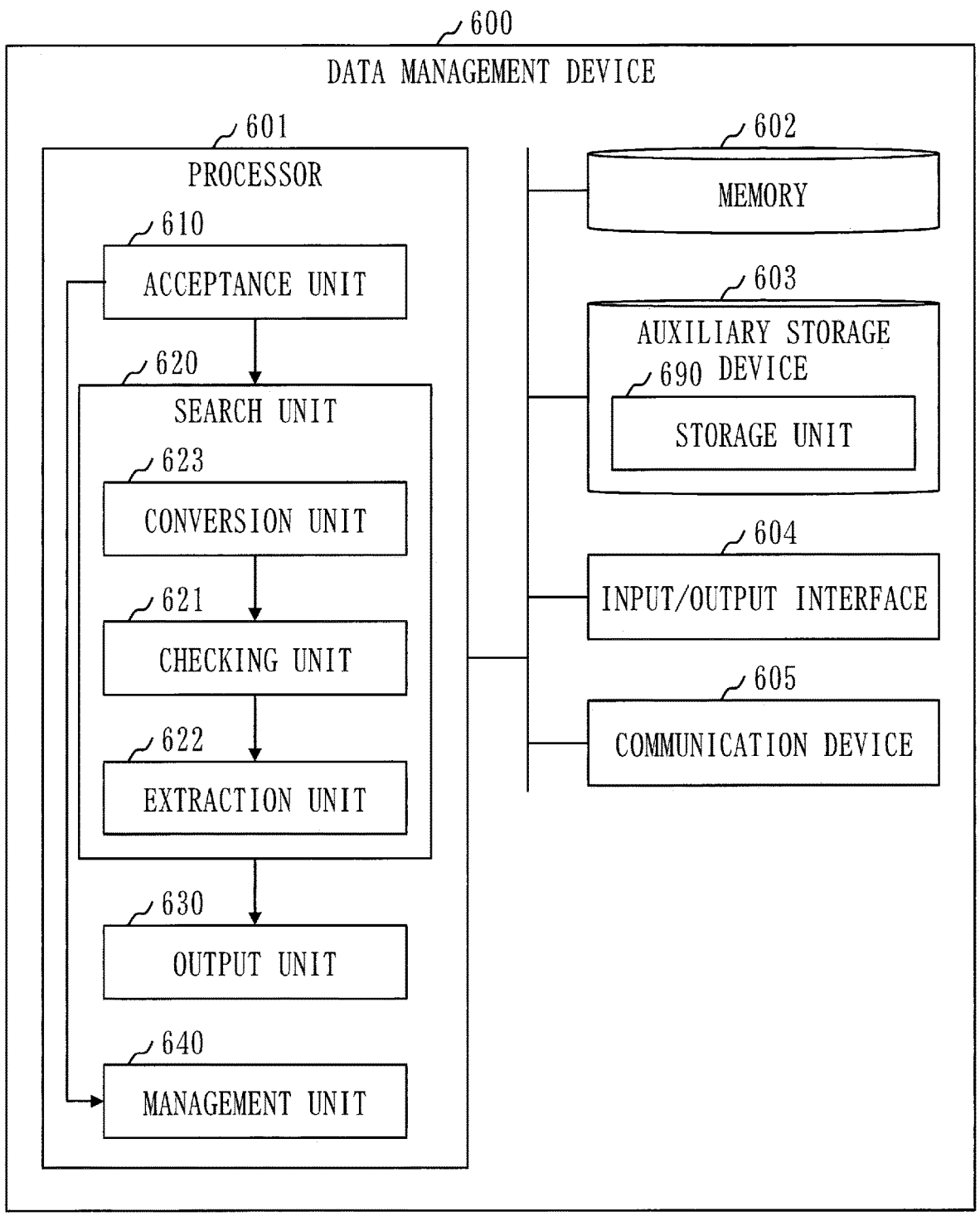
FIG. 32 is a configuration diagram of the data management device 600 in Embodiment 4.

Based on FIG. 32, the configuration of the data management device 600 will be described.

The data management device 600 includes an element called the conversion unit 623.

*Description of Operation*

Figure 33:
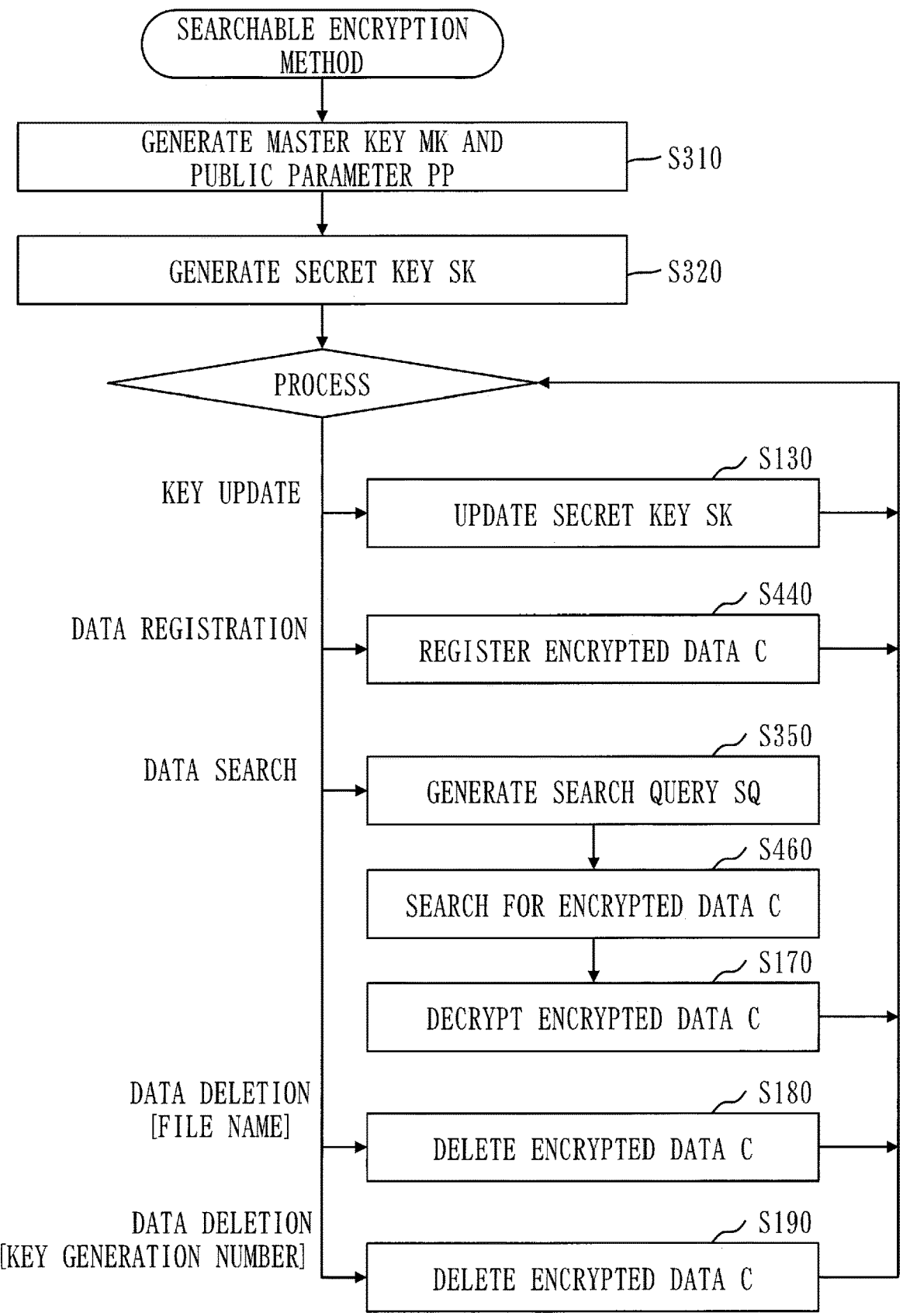
FIG. 33 is a flowchart of the searchable encryption method in Embodiment 4.

Based on FIG. 33, the searchable encryption method will be described.

Steps S310 and S320 are as described in Embodiment 3.

Steps S130, S170, S180, and S190 are as described in Embodiment 1.

Steps S440 and S460 will be described below.

Figure 34:
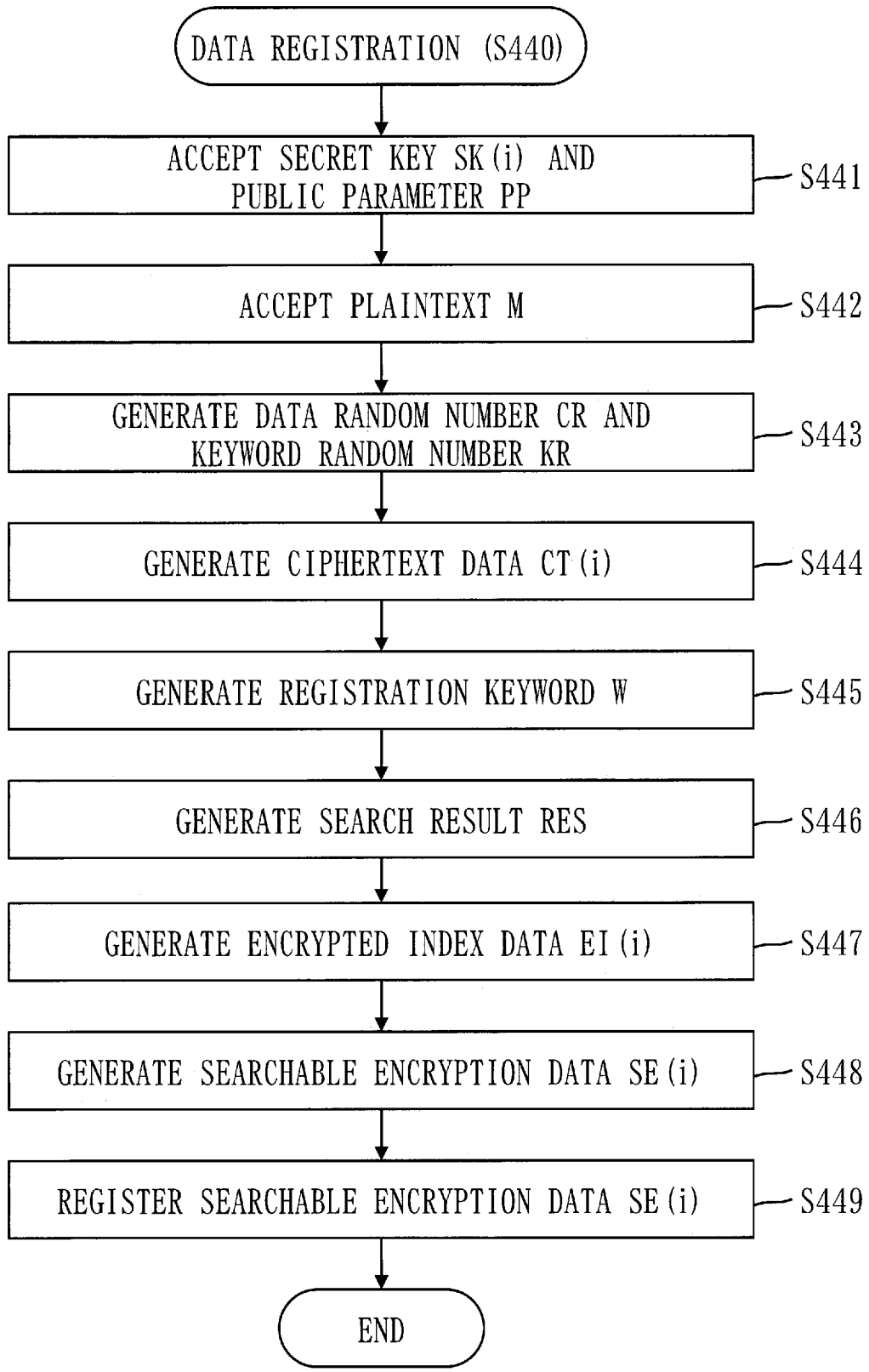
FIG. 34 is a flowchart of data registration (S440) in Embodiment 4.

Based on FIG. 34, a procedure for data registration (S440) will be described.

The data registration (S440) is equivalent to step S240 in Embodiment 2.

In step S441, the acceptance unit 410 accepts the secret key SK(i) and the public parameter PP.

Step S441 is the same as step S241 in Embodiment 2.

In step S442, the acceptance unit 410 accepts a plaintext M.

Step S442 is the same as step S242 in Embodiment 2.

In step S443, the random number generating unit 421 generates a data random number CR and a keyword random number KR.

Step S443 is the same as step S243 in Embodiment 2.

In step S444, the ciphertext data generating unit 422 encrypts the plaintext M, using the secret key SK(i), the public parameter PP, and the data random number CR. As a result, ciphertext data CT(i) is generated.

Step S444 is the same as step S244 in Embodiment 2.

In step S445, the keyword generating unit 423 generates a registration keyword W.

Step S445 is the same as step S245 in Embodiment 2.

It is assumed that at least one plaintext M is accepted in step S442, at least one ciphertext data CT(i) is generated in step S444, and at least one registration keyword W is generated in step S445.

In step S446, the search result generating unit 425 generates a search result RES based on at least one registration keyword W.

Step S446 is the same as step S246 in Embodiment 2.

In step S447, the encrypted index generating unit 426 encrypts the search result RES, using the secret key SK(i), the public parameter PP, and the keyword random number KR. As a result, encrypted index data EI(i) is generated.

The encrypted index data EI(i) includes the encrypted index EI and the key generation number i.

The encrypted index EI is the search result RES that has been encrypted, and includes the encrypted keyword key and the encrypted identifier val.

The encrypted keyword key is a registration keyword kw that has been encrypted. The registration keyword kw is encrypted using the keyword key KK(i).

The encrypted identifier val is the identifier res that has been encrypted. The identifier res is encrypted using the encrypted registration keyword kw and the keyword random number KR.

For example, the encrypted index data EI(i) is expressed as indicated below.

$$EI=\{(key, val)\}$$

$$key=F(0\|KK(i)^{F(kw)} \bmod N)$$

$$val=E(F(1\|KK(i)^{F(kw)} \bmod N), res, KR)$$

That is, the encrypted keyword key is obtained by encrypting an exponentiation remainder with the keyword key KK(i) as a base, the registration keyword kw as an exponent, and modulo the product N, using the cryptographic function F.

The encrypted identifier val is obtained by calculating a value to be a key by encrypting an exponentiation remainder with the keyword key KK(i) as a base, the registration keyword kw as an exponent, and modulo the product N, using the cryptographic function F, and encrypting the identifier res using the calculated key and the keyword random number KR.

The product N is the product of the prime number P and the prime number Q (see step S312 in Embodiment 3).

In step S448, the registration unit 430 generates searchable encryption data SE(i).

The searchable encryption data SE(i) includes the file name File(M), the ciphertext data CT, the encrypted index data EI(i), and the key generation number i.

Step S448 is the same as step S248 in Embodiment 2.

In step S449, the registration unit 430 registers the searchable encryption data SE(i) in the registration database 691.

Step S449 is the same as step S249 in Embodiment 2.

Figure 35:
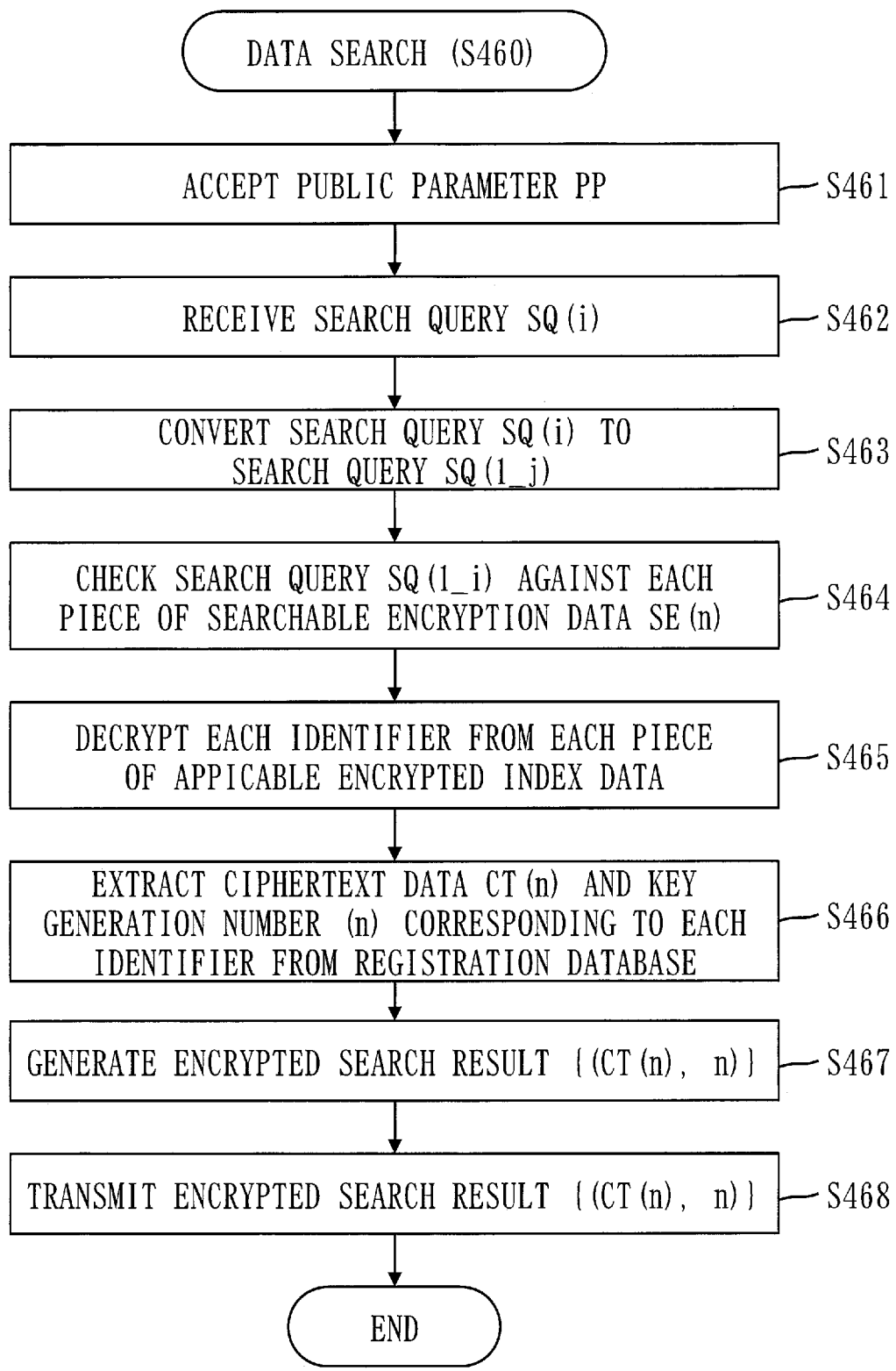
FIG. 35 is a flowchart of data search (S460) in Embodiment 4.

Based on FIG. 35, a procedure for data search (S460) will be described.

The data search (S460) is equivalent to step S160 in Embodiment 1, step S260 in Embodiment 2, and step S360 in Embodiment 3.

In step S461, the acceptance unit 610 accepts the public parameter PP.

Step S461 is the same as step S161 in Embodiment 1.

In step S462, the acceptance unit 610 receives the search query SQ(1_i).

Step S462 is the same as step S162 in Embodiment 1.

In step S463, the conversion unit 623 converts the search query SQ(i) to the search query SQ(1_j).

Step S463 is the same as step S363 in Embodiment 3.

In step S464, the checking unit 621 checks the search query SQ(1_i) against each piece of searchable encryption data SE(n) in the registration database 691 so as to find searchable encryption data SE(n) that matches the search query SQ(1_i).

The checking unit 621 checks the search query SQ(1_i) against the searchable encryption data SE(n) as described below.

First, the checking unit 621 calculates the first query SQ(k)1 and the second query SQ(k)2, for each search query SQ(k) included in the search query SQ(1_i).

The first query SQ(k)1 and the second query SQ(k)2 are expressed as indicated below.

$$SQ(k)1 = F(0 \| SQ(k) \bmod N)$$

$$SQ(k)2 = F(1 \| SQ(k) \bmod N)$$

Next, the checking unit 621 determines whether the key generation number n included in the searchable encryption data SE(n) is equal to or smaller than i.

If the key generation number n is equal to or smaller than i, the checking unit 621 extracts the encrypted index EI from the encrypted index data EI(n) in the searchable encryption data SE(n).

Then, the checking unit 621 compares the first query SQ(k)1 with each encrypted keyword key in the encrypted index EI, for each search query SQ(k) included in the search query SQ(1_j).

If the encrypted keyword key that matches the first query SQ(k)1 is found, the searchable encryption data SE(n) matches the search query SQ(1_i).

The searchable encryption data SE(n) that matches the search query (1_i) is referred to as the "applicable searchable encryption data SE(n)". The applicable searchable encryption data SE(n) includes the encrypted index data EI(n) that matches the search query SQ(1_i).

The encrypted keyword key that matches the first query SQ(k)1 is referred to as the "applicable encrypted keyword key". The encrypted index data EI(n) including the applicable encrypted keyword key is referred to as the "applicable encrypted index data EI(n)".

The second query SQ(k)2 corresponding to the first query SQ(k)1 is referred to as the "applicable second query SQ(k)2".

In step S465, the extraction unit 622 extracts at least one encrypted identifier val corresponding to the applicable encrypted keyword key from each piece of the applicable encrypted index data EI(n).

Then, the extraction unit 622 decrypts the identifier res from the encrypted identifier val, using the applicable second query SQ(k)2, for each extracted encrypted identifier val. The identifier res is decrypted as indicated below.

$$res = D(SQ(k)2, val)$$

In step S466, the extraction unit 622 extracts, for each decrypted identifier res, a set of the ciphertext data CT and the key generation number n associated with the same file name File(M) as the identifier res from the registration database 691.

In step S467, the output unit 630 generates data including a set that includes each set of the ciphertext data CT(n) and the key generation number n. The generated data is the encrypted search result $\{(CT(n), n)\}$.

Step S467 is the same as step S165 in Embodiment 1.

In step S468, the output unit 630 transmits the encrypted search result $\{(CT(n), n)\}$ to the search operation device 500, using the communication device 605.

Step S468 is the same as step S166 in Embodiment 1.

Effects of Embodiment 4

Embodiment 4 allows a key update to be performed also in the scheme using the encrypted index EI in searchable encryption of the common-key scheme. In addition, the old search query (1_j) can be restored from the new search query (i).

Embodiment 4 has the following effect in addition to substantially the same effects as those of Embodiment 3.

Identifiers that are found as hits for a search keyword can be extracted collectively without decrypting cyphertexts.

Supplement to Embodiments

Figure 36:
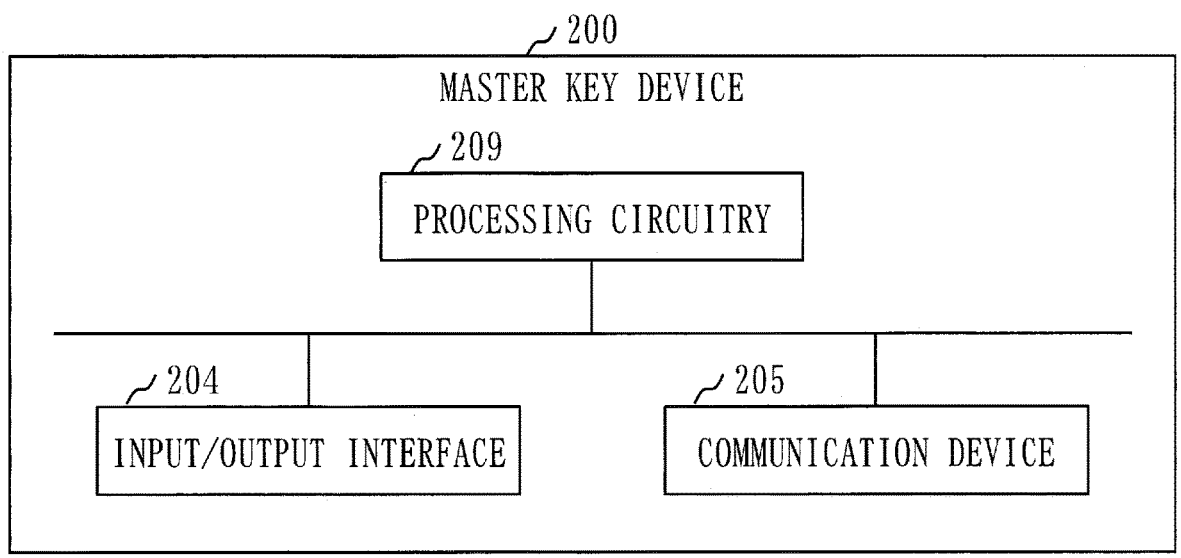
FIG. 36 is a hardware configuration diagram of the master key device 200 in the embodiments.

Based on FIG. 36, a hardware configuration of the master key device 200 will be described.

The master key device 200 includes processing circuitry 209.

The processing circuitry 209 is hardware that realizes the acceptance unit 210, the generating unit 220, and the output unit 230.

The processing circuitry 209 may be dedicated hardware, or may be the processor 201 that executes programs stored in the memory 202.

When the processing circuitry 209 is dedicated hardware, the processing circuitry 209 is, for example, a single circuit, a composite circuit, a programmed processor, a parallel-programmed processor, an ASIC, an FPGA, or a combination of these.

ASIC is an abbreviation for application specific integrated circuit.

FPGA is an abbreviation for field programmable gate array.

The master key device 200 may include a plurality of processing circuits as an alternative to the processing circuitry 209.

In the processing circuitry 209, some functions may be realized by dedicated hardware, and the remaining functions may be realized by software or firmware.

As described above, the functions of the master key device 200 can be realized by hardware, software, firmware, or a combination of these.

Figure 37:
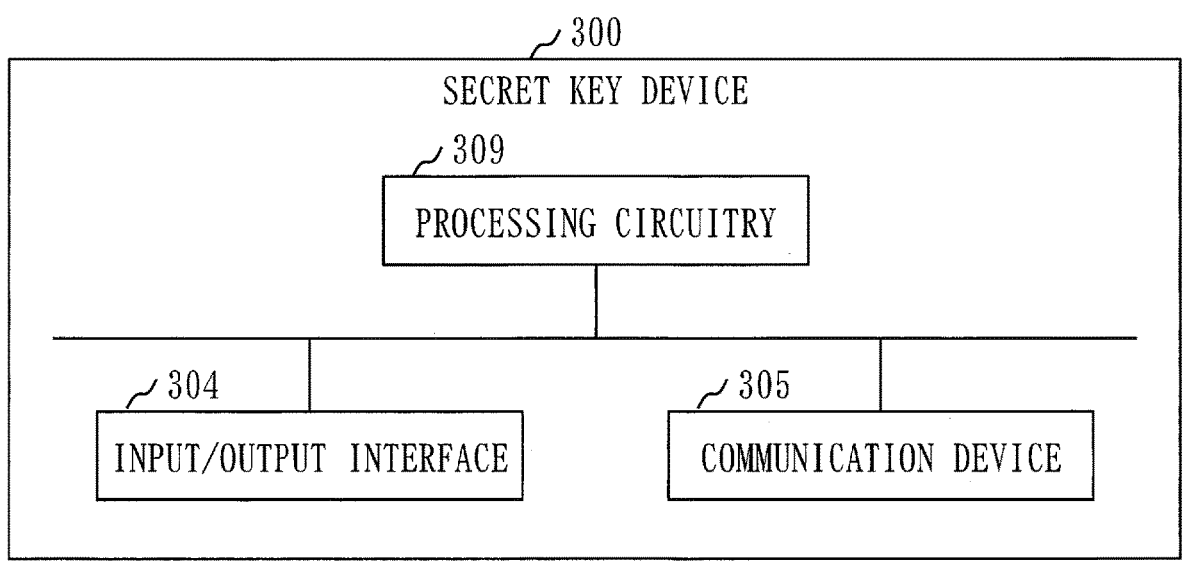
FIG. 37 is a hardware configuration diagram of the secret key device 300 in the embodiments.

Based on FIG. 37, a hardware configuration of the secret key device 300 will be described.

The secret key device 300 includes processing circuitry 309.

The processing circuitry 309 is hardware that realizes the acceptance unit 310, the generating unit 320, and the output unit 330.

The processing circuitry 309 may be dedicated hardware, or may be the processor 301 that executes programs stored in the memory 302.

When the processing circuitry 309 is dedicated hardware, the processing circuitry 309 is, for example, a single circuit, a composite circuit, a programmed processor, a parallel-programmed processor, an ASIC, an FPGA, or a combination of these.

The secret key device 300 may include a plurality of processing circuits as an alternative to the processing circuitry 309.

In the processing circuitry 309, some functions may be realized by dedicated hardware, and the remaining functions may be realized by software or firmware.

As described above, the functions of the secret key device 300 can be realized by hardware, software, firmware, or a combination of these.

Figure 38:
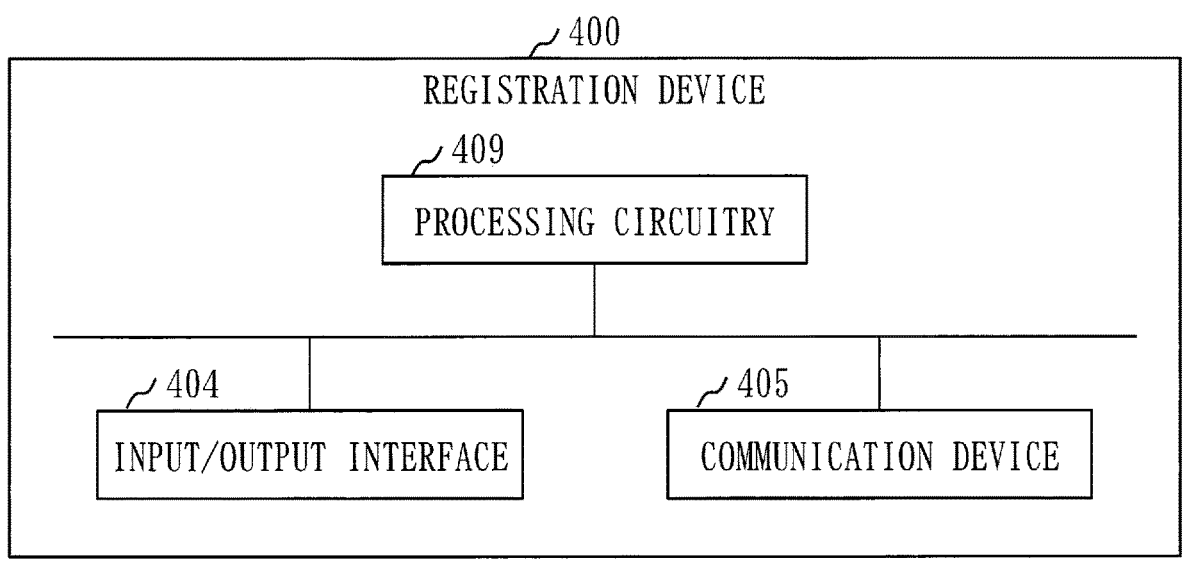
FIG. 38 is a hardware configuration diagram of the registration device 400 in the embodiments.

Based on FIG. 38, a hardware configuration of the registration device 400 will be described.

The registration device 400 includes processing circuitry 409.

The processing circuitry 409 is hardware that realizes the acceptance unit 410, the generating unit 420, and the registration unit 430.

The processing circuitry 409 may be dedicated hardware, or may be the processor 401 that executes programs stored in the memory 402.

When the processing circuitry 409 is dedicated hardware, the processing circuitry 409 is, for example, a single circuit, a composite circuit, a programmed processor, a parallel-programmed processor, an ASIC, an FPGA, or a combination of these.

The registration device 400 may include a plurality of processing circuits as an alternative to the processing circuitry 409.

In the processing circuitry 409, some functions may be realized by dedicated hardware, and the remaining functions may be realized by software or firmware.

As described above, the functions of the registration device 400 can be realized by hardware, software, firmware, or a combination of these.

Figure 39:
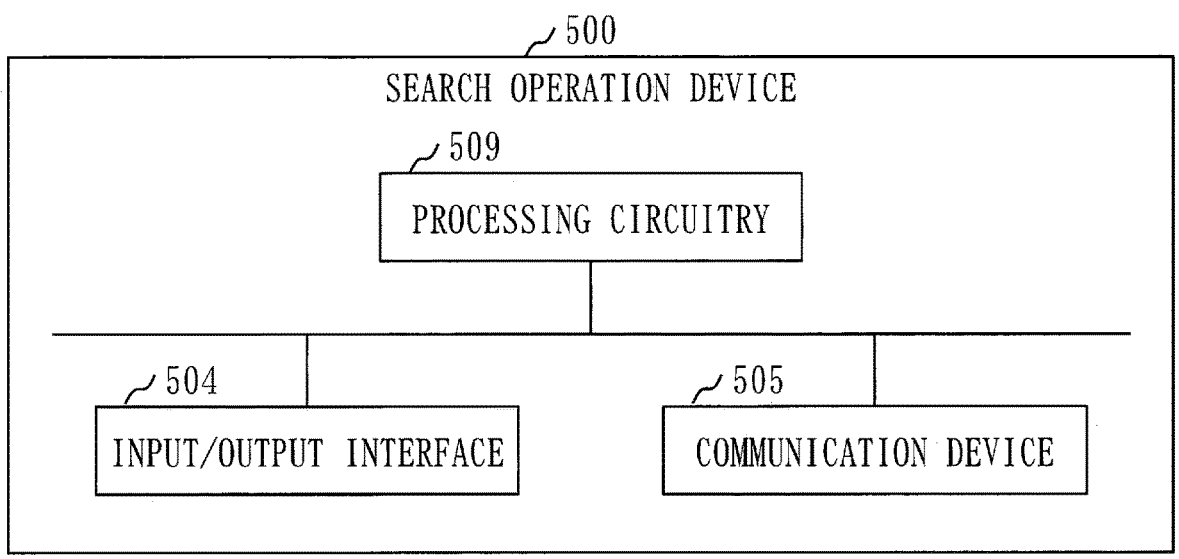
FIG. 39 is a hardware configuration diagram of the search operation device 500 in the embodiments.

Based on FIG. 39, a hardware configuration of the search operation device 500 will be described.

The search operation device 500 includes processing circuitry 509.

The processing circuitry 509 is hardware that realizes the acceptance unit 510, the restoration unit 520, the generating unit 530, the request unit 540, the decryption unit 550, and the output unit 560.

The processing circuitry 509 may be dedicated hardware, or may be the processor 501 that executes programs stored in the memory 502.

When the processing circuitry 509 is dedicated hardware, the processing circuitry 509 is, for example, a single circuit, a composite circuit, a programmed processor, a parallel-programmed processor, an ASIC, an FPGA, or a combination of these.

The search operation device 500 may include a plurality of processing circuits as an alternative to the processing circuitry 509.

In the processing circuitry 509, some functions may be realized by dedicated hardware, and the remaining functions may be realized by software or firmware.

As described above, the functions of the search operation device 500 can be realized by hardware, software, firmware, or a combination of these.

Figure 40:
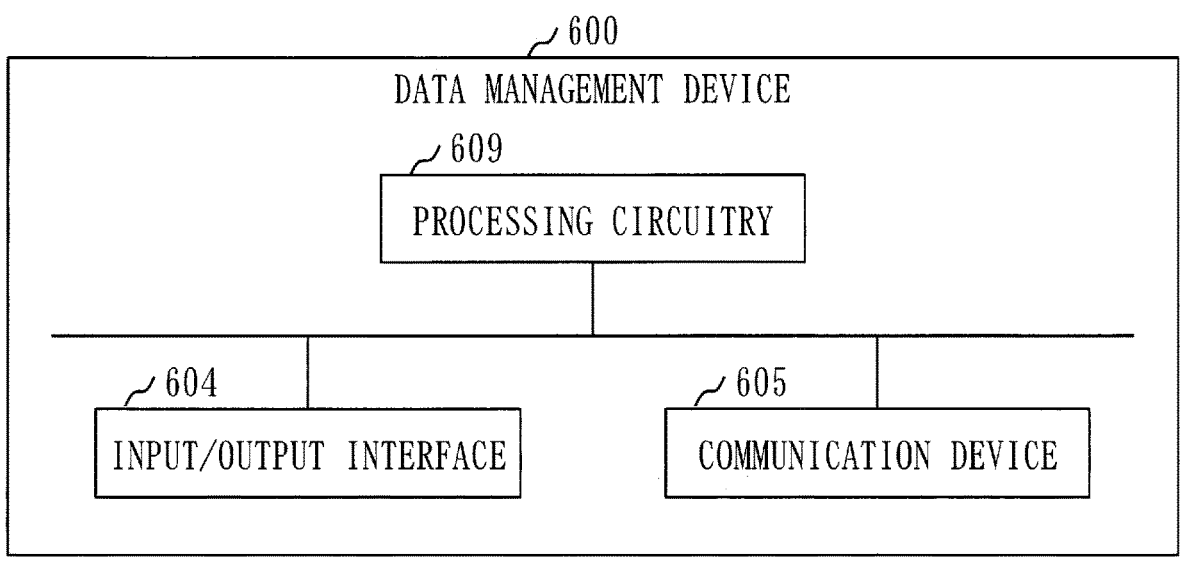
FIG. 40 is a hardware configuration diagram of the data management device 600 in the embodiments.

Based on FIG. 40, a hardware configuration of the data management device 600 will be described.

The data management device 600 includes processing circuitry 609.

The processing circuitry 609 is hardware that realizes the acceptance unit 610, the search unit 620, the output unit 630, and the management unit 640.

The processing circuitry 609 may be dedicated hardware, or may be the processor 601 that executes programs stored in the memory 602.

When the processing circuitry 609 is dedicated hardware, the processing circuitry 609 is, for example, a single circuit, a composite circuit, a programmed processor, a parallel-programmed processor, an ASIC, an FPGA, or a combination of these.

The data management device 600 may include a plurality of processing circuits as an alternative to the processing circuitry 609.

In the processing circuitry 609, some functions may be realized by dedicated hardware, and the remaining functions may be realized by software or firmware.

As described above, the functions of the data management device 600 can be realized by hardware, software, firmware, or a combination of these.

Each of the embodiments is an example of a preferred embodiment and is not intended to limit the technical scope of the present disclosure. Each of the embodiments may be implemented partially, or may be implemented in combination with another embodiment. The procedures described using the flowcharts or the like may be suitably modified.

Each device described in the embodiments may be realized by a plurality of devices. Alternatively, two or more devices described in the embodiments may be realized by one device.

Each "unit" that is an element of each device described in the embodiments may be interpreted as "process", "step", "circuit", or "circuitry".

REFERENCE SIGNS LIST

100: searchable encryption system, 101: network, 200: master key device, 201: processor, 202: memory, 203: auxiliary storage device, 204: input/output interface, 205: communication device, 209: processing circuitry, 210: acceptance unit, 220: generating unit, 230: output unit, 290: storage unit, 300: secret key device, 301: processor, 302: memory, 303: auxiliary storage device, 304: input/output interface, 305: communication device, 309: processing circuitry, 310: acceptance unit, 320: generating unit, 330: output unit, 390: storage unit, 400: registration device, 401: processor, 402: memory, 403: auxiliary storage device, 404: input/output interface, 405: communication device, 409: processing circuitry, 410: acceptance unit, 420: generating unit, 421: random number generating unit, 422: ciphertext data generating unit, 423: keyword generating unit, 424:

encrypted tag generating unit, 425: search result generating unit, 426: encrypted index generating unit, 430: registration unit, 490: storage unit, 500: search operation device, 501: processor, 502: memory, 503: auxiliary storage device, 504: input/output interface, 505: communication device, 509: processing circuitry, 510: acceptance unit, 520: restoration unit, 530: generating unit, 540: request unit, 550: decryption unit, 560: output unit, 590: storage unit, 600: data management device, 601: processor, 602: memory, 603: auxiliary storage device, 604: input/output interface, 605: communication device, 609: processing circuitry, 610: acceptance unit, 620: search unit, 621: checking unit, 622: extraction unit, 623: conversion unit, 630: output unit, 640: management unit, 690: storage unit, 691: registration database.

The invention claimed is:

1. A searchable encryption system comprising:
first processing circuitry to:
encrypt a plaintext to generate ciphertext data, using a new data key generated by multiple encryption, and encrypt a registration keyword to generate an encrypted keyword, using a new keyword key generated by the multiple encryption, and
register a set of the ciphertext data and the encrypted keyword in a registration database;
second processing circuitry to:
encrypt a search keyword to generate a new search query, using the new keyword key;
third processing circuitry to:
convert the new search query to an old search query that is generated using an old keyword key corresponding to the new keyword key, based on the multiple encryption,
find an encrypted keyword that matches one of the new search query and the old search query from the registration database, and
output an encrypted search result including ciphertext data corresponding to the encrypted keyword that has been found,
wherein the second processing circuitry restores an old data key from the new data key, based on the multiple encryption, and
decrypts a plaintext from the ciphertext data included in the encrypted search result, using one of the new data key and the old data key.

2. The searchable encryption system according to claim 1,
wherein the first processing circuitry generates encrypted tag data including the encrypted keyword, and generates searchable encryption data including the ciphertext data and the encrypted tag data, and
registers the searchable encryption data in the registration database, and
wherein the third processing circuitry finds, as applicable searchable encryption data, searchable encryption data including encrypted tag data that matches one of the new search query and the old search query from the registration database, and
outputs, as the encrypted search result, data including ciphertext data included in the applicable searchable encryption data.

3. The searchable encryption system according to claim 2,
wherein the first processing circuitry generates, as the encrypted tag data, data including the encrypted keyword and a keyword random number, and
wherein the third processing circuitry generates, for each search query of the new search query and the old search query, a checking tag using the search query and the keyword random number in the encrypted tag data, and when one of the checking tags matches the encrypted keyword in the encrypted tag data, finds the searchable encryption data including the encrypted tag data as the applicable searchable encryption data.

4. The searchable encryption system according to claim 1,
wherein the first processing circuitry generates, as a search result, at least one set of a registration keyword and an identifier, encrypts the search result, using the new keyword key, so as to generate encrypted index data including at least one set of the encrypted keyword and an encrypted identifier, and generates searchable encryption data including the ciphertext data, the encrypted index data, and a file name, and
registers the searchable encryption data in the registration database, and
wherein the third processing circuitry finds, as applicable encrypted index data, encrypted index data including an encrypted keyword that matches one of the new search query and the old search query from the registration database,
decrypts each identifier from each encrypted identifier in the applicable encrypted index data, using an applicable search query that is a search query, of the new search query and the old search query, that matches the applicable encrypted index data, and extracts ciphertext data corresponding to the same file name as each identifier from the registration database, and
outputs, as the encrypted search result, data including each piece of extracted ciphertext data.

* * * * *